(12) United States Patent
Shin et al.

(10) Patent No.: US 10,516,829 B2
(45) Date of Patent: Dec. 24, 2019

(54) MOBILE TERMINAL AND METHOD FOR CONTROLLING SAME

(71) Applicant: LG ELECTRONICS INC., Seoul (KR)

(72) Inventors: Youngho Shin, Seoul (KR); Kyungju Lee, Seoul (KR); Joonsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 15/312,535

(22) PCT Filed: May 22, 2014

(86) PCT No.: PCT/KR2014/004572
§ 371 (c)(1),
(2) Date: Nov. 18, 2016

(87) PCT Pub. No.: WO2015/178520
PCT Pub. Date: Nov. 26, 2015

(65) Prior Publication Data
US 2017/0118413 A1     Apr. 27, 2017

(51) Int. Cl.
*H04N 5/232* (2006.01)
*H04N 5/262* (2006.01)
(Continued)

(52) U.S. Cl.
CPC ........... *H04N 5/23293* (2013.01); *G06F 3/14* (2013.01); *H04M 1/72563* (2013.01);
(Continued)

(58) Field of Classification Search
CPC ........ H04N 5/23293–232945; H04N 1/00469; H04N 1/00442–0045; H04N 5/23216;
(Continued)

(56) References Cited

U.S. PATENT DOCUMENTS

2008/0240563 A1* 10/2008 Takano .............. H04N 5/23219
                                                    382/173
2008/0317285 A1* 12/2008 Abe .................... H04N 5/23216
                                                    382/103
(Continued)

FOREIGN PATENT DOCUMENTS

KR     10-2006-0094608     8/2006
KR     10-2006-0108402     10/2006
(Continued)

OTHER PUBLICATIONS

PCT International Application No. PCT/KR2014/004572, Written Opinion of the International Searching Authority, dated Feb. 5, 2015, 10 pages.

*Primary Examiner* — Paul M Berardesca
(74) *Attorney, Agent, or Firm* — Lee, Hong, Degerman, Kang & Waimey

(57) ABSTRACT

The present invention relates to a mobile terminal which can be implemented by allowing a user to use the terminal more conveniently, and a method for controlling the same. The present invention may comprise a camera, a display, and a control unit which enlarges a partial region of an original image photographed by the camera at a predetermined magnification and displays the original image and the enlarged image simultaneously on the display, wherein the control unit, upon receiving a magnification photographing input from a user input unit, can activate the camera for photographing, enlarge a partial region of the original image photographed by the camera at a predetermined magnification and display the original image and the enlarged image simultaneously on the display.

9 Claims, 26 Drawing Sheets

(51) Int. Cl.
  *G06F 3/14* (2006.01)
  *H04M 1/725* (2006.01)
  *H04N 5/265* (2006.01)
  *H04N 5/44* (2011.01)

(52) U.S. Cl.
  CPC ..... *H04N 5/23216* (2013.01); *H04N 5/23296* (2013.01); *H04N 5/265* (2013.01); *H04N 5/2628* (2013.01); *H04N 5/44* (2013.01); *G09G 2340/045* (2013.01); *G09G 2354/00* (2013.01); *H04M 2250/22* (2013.01); *H04M 2250/52* (2013.01)

(58) Field of Classification Search
  CPC ........... H04N 5/23218; H04N 5/23219; H04N 5/23296; H04N 5/2628; G09G 2340/045
  See application file for complete search history.

(56) References Cited

U.S. PATENT DOCUMENTS

| | | | | |
|---|---|---|---|---|
| 2009/0244357 A1* | 10/2009 | Huang | ............... | H04N 5/23212 348/345 |
| 2010/0208123 A1* | 8/2010 | Akagi | ................... | H04N 5/2628 348/333.12 |
| 2012/0154442 A1* | 6/2012 | Takaoka | ............. | H04N 5/23216 345/634 |
| 2014/0354845 A1* | 12/2014 | Molgaard | .............. | H04N 1/215 348/222.1 |

FOREIGN PATENT DOCUMENTS

| | | |
|---|---|---|
| KR | 10-2011-0011414 | 2/2011 |
| KR | 10-2012-0007403 | 1/2012 |

\* cited by examiner

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2014/004572, filed on May 22, 2014, the contents of which are all hereby incorporated by reference herein in its entirety.

TECHNICAL FIELD

The present invention relates to a mobile terminal and controlling method thereof, which facilitates the use of the terminal in further consideration of user's convenience.

BACKGROUND ART

Generally, terminals can be classified into mobile/portable terminals and stationary terminals according to their mobility. The mobile terminals can be further classified into handheld terminals and vehicle mount terminals according to possibility of user's direct portability.

The mobile terminals have become increasingly more functional. Examples of such functions include data and voice communication, image and video capturing through a camera, voice recording, music file playback through a speaker system, and image and video displaying on a display unit. Some mobile terminals include additional functions for supporting game playing and working as multimedia players. In particular, current mobile terminals can receive multicast signals including visual contents such as videos and television programs.

As functions of a mobile terminal are diversified, the mobile terminal becomes the multimedia player with multiple functions of capturing images or videos, playing back music files or video files, gaming, and receiving broadcasting programs.

To support and increase the functionality of the terminal, the improvement of structural parts and/or software parts of the terminal can be taken into account.

In particular, even though hardware performance of a camera installed in the current terminal has been remarkably improved, relevant software has not been sufficiently developed. Moreover, since the multimedia device is generally provided with a processor with high performance, a user can properly utilize the high-performance processor and camera when photographing an image through the camera In case of photographing though the terminal, there may be cases where a person's face on the photograph is too small to recognize. For instance, when a user requests people to take a photograph using the user's terminal, most of the people take the photograph without changing a camera setting of the terminal. In this case, most of the photograph may be taken up by the surrounding environment and the user's face may be too small to recognize.

In addition, some existing terminals may have functions of simultaneously photographing a plurality of images and allowing their users to select desired images from the plurality of the images. However, the terminals has a disadvantage in that if an object or a person on the images is too small, the number of the desired images may not be sufficient. In other words, since the existing terminals do not provide functions of automatically enlarging a person on an image and displaying the enlarged one, the users have difficulty in selecting a desired image.

In case that images are photographed using a terminal, if the terminal has functions of automatically enlarging people or objects on the images and providing the enlarged images to its user, the user may easily save desired images. In consideration this, such a terminal that provides improved convenience needs to be developed.

DISCLOSURE OF THE INVENTION

Technical Task

An object of the present invention is to solve the aforementioned problems and other problems. Another object of the present invention is to provide a mobile terminal configured to photograph images, automatically enlarge a person or an object on the photographed images, provide the enlarged images to a user, and allow the user to select a desired image easily and conveniently and controlling method thereof.

Technical Solutions

In one aspect of the present invention, provided herein is a mobile terminal including a camera, a display, and a controller. The controller may enlarge a partial area of an original image photographed by the camera at a predetermined magnification and simultaneously display the original image and the enlarged image on the display.

In this case, after displaying the original image on the display, the controller may display the enlarged image by overlapping the enlarged image over the original image.

In one case, the controller may simultaneously display the original image and the enlarged image side by side on the display.

In another case, the controller may display a plurality of enlarged images with different magnifications on the display.

In a further case, the controller may display a plurality of enlarged images with the same magnification on the display.

In addition, when intending to enlarge the original image, the controller may enlarge the original image with respect to a predetermined center point.

Alternatively, when intending to enlarge the original image, the controller may enlarge the original image with respect to a user's touch point on the original image.

The mobile terminal according to the present invention may further include a user input unit for receiving an enlargement photography input. When the enlargement photography input is received from the user input unit, the controller may enable the camera to photograph the image, enlarge the partial area of the original image photographed by the camera at the predetermined magnification, and simultaneously display the original image and the enlarged image on the display.

In another aspect of the present invention, provided herein is a mobile terminal including a camera, a display, and a controller. The controller may control the camera to continuously photograph a plurality of images at different magnifications and simultaneously display an original image photographed at a first magnification and at least one of enlarged images photographed at magnifications higher than the first magnification among the plurality of the images continuously photographed by the camera on the display.

The mobile terminal according to the present invention may further include a user input unit for receiving an enlargement photography input. When the enlargement photography input is received from the user input unit, the controller may enable the camera to photograph the images and simultaneously display the original image photographed at the first magnification and at least one of the enlarged images photographed at the magnifications higher than the first magnification among the plurality of the images continuously photographed by the camera on the display.

In a further aspect of the present invention, provided herein is a method of controlling a mobile terminal including a camera and a display, including: receiving an enlargement photography input; if receiving the enlargement photography input, enabling the camera to photograph an image; enlarging a partial area of the original image photographed by the camera at a predetermined magnification; and simultaneously displaying the original image and the enlarged image on the display.

In a yet further aspect of the present invention, provided herein is a method of controlling a mobile terminal including a camera and a display, including: receiving an enlargement photography input; if receiving the enlargement photography input, enabling the camera to continuously photograph a plurality of images at different magnifications; and simultaneously displaying an original image photographed at a first magnification and at least one of enlarged images photographed at magnifications higher than the first magnification among the plurality of the images continuously photographed by the camera on the display.

Advantageous Effects

The mobile terminal according to the present invention has the following advantages.

According to at least one of embodiments of the present invention, after photographing images, the mobile terminal automatically enlarges a person or an object on the photographed images and then provides the enlarged images to a user, whereby the user can select a desired image easily and conveniently.

The additional scope of applicability of the present invention can become obvious from the detailed description in the following. However, since it will be apparent to those skilled in the art that various modifications and variations can be made therein without departing from the spirit and scope of the invention, the detailed description and a specific embodiment such as a preferred embodiment of the present invention should be understood as taken as one example only.

BEST MODE FOR INVENTION

Figure 1:
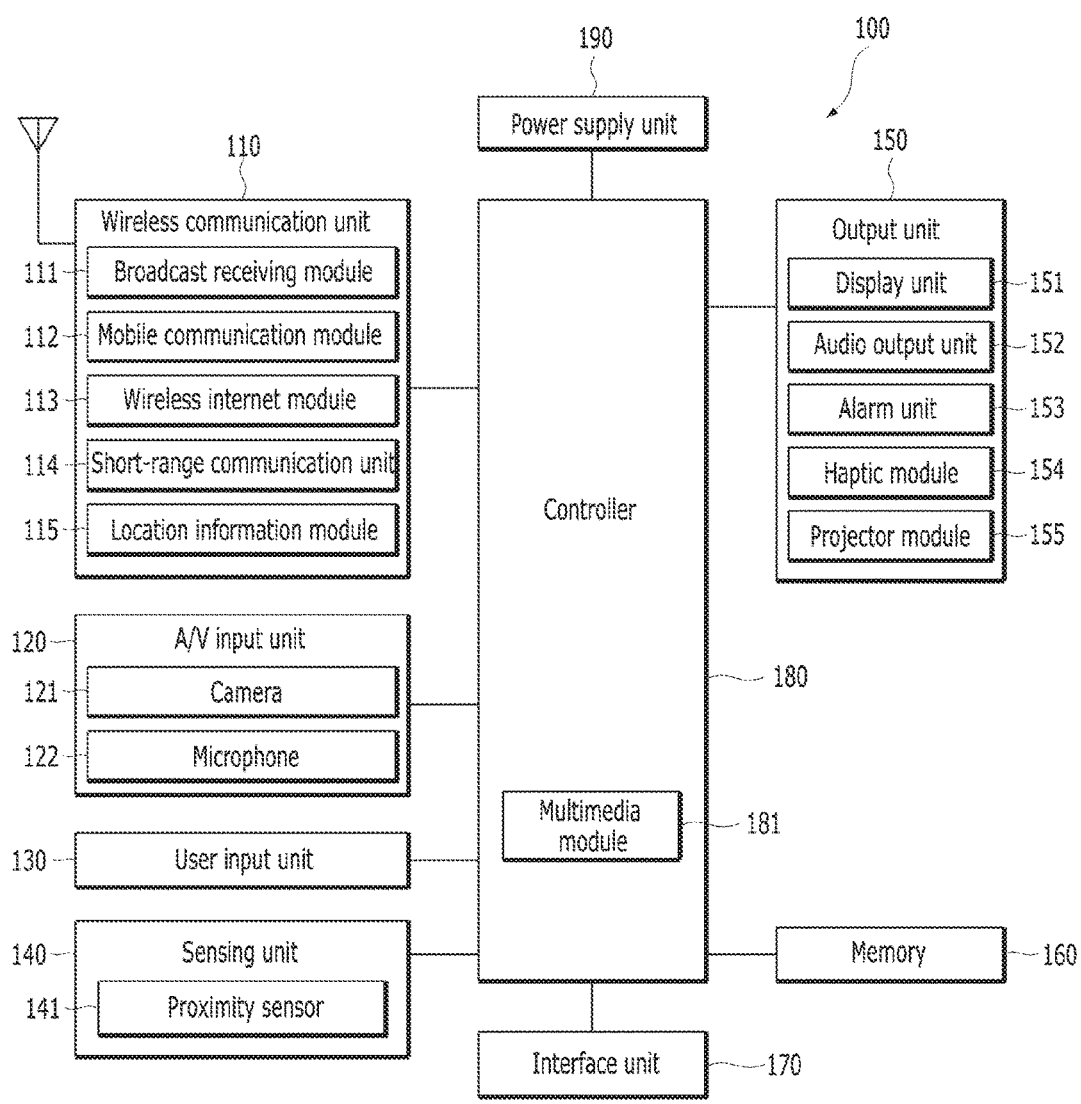
FIG. 1 is a block diagram of a mobile terminal related to one embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first ($1^{st}$), second ($2^{nd}$), etc. may be used herein to describe various elements, and these elements should not be limited by these terms. These terms are generally only used to distinguish one element from another.

It will be understood that when an element is referred to as being "connected with" or "accessed by" another element, the element can be directly connected with or accessed by the other element or intervening elements may also be present. In contrast, when an element is referred to as being "directly connected with" or "directly accessed by" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

Mobile terminals presented herein may be implemented using a variety of different types of terminals. Examples of such terminals may include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like. By way of non-limiting example only, further description will be made with reference to particular types of mobile terminals. However, such teachings apply equally to other types of stationary terminals such as digital TVs, desktop computers, digital signage players and the like.

FIG. 1 is a block diagram of a mobile terminal according to one embodiment of the present invention.

A mobile terminal 100 may include components such as a wireless communication unit 110, an input unit 120, a sensing unit 140, an output unit 150, an interface unit 170, a memory 160, a controller 180, a power supply unit 190 and the like. It is appreciated that implementing all of the components shown in FIG. 1 is not a requirement, and that greater or fewer components may alternatively be implemented.

The detailed description of each component is as follows.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. The wireless communication unit 110 may include one or more of a broadcast receiving module 111, a mobile communication module 112, a wireless Internet module 113, a short-range communication module 114, and a location information module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast associated information includes information associated with a broadcast channel, a broadcast program, or a broadcast service provider.

Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

The wireless Internet module 113 such as Wibro, HSDPA, GSM, CDMA, WCDMA, or LTE may be a kind of to the mobile communication module performing Internet access through the mobile network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 151 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 151 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

a proximity sensor 141 can be provided at an internal area of the mobile terminal 100 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 is able to output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures.

Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touch screen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 is able to operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls overall operations of the mobile terminal 100. For example, the controller 180 performs controlling and processing associated with voice calls, data communications, video calls, etc. The controller 180 may include a multimedia module 181 that provides multimedia playback. The multimedia module 181 may be provided within the controller 180 or implemented as a separate component.

The controller 180 may perform a pattern recognition processing to recognize a handwriting input or a picture drawing input performed on the touch screen as characters or images, respectively.

Meanwhile, the controller 180 may enlarge a partial area of an original image photographed by the camera 121 according to a predetermined magnification and then simultaneously display the original image and the enlarged image on the display unit 151. In this case, the controller 180 may first display the original image on the display unit 151 and then display the enlarged image by overlapping it over the original image. For instance, the enlarged image displayed over the original image may be a mini-image with a small size.

In one case, the controller 180 may simultaneously display the original image and the enlarged image side by side on the display unit 151.

In addition, when displaying the enlarged image on the display unit 151, the controller 180 may change the current resolution of the display unit 151 such that the resolution matches with the predetermined magnification of the enlarged image.

In another case, the controller 180 may display a plurality of enlarged images with different magnifications on the display unit 151. In this case, the plurality of the enlarged images with the different magnifications may be the same images photographed at the same time or different images photographed at different times.

In a further case, the controller 180 may display a plurality of enlarged images with the same magnification on the display unit 151. In this case, the plurality of the enlarged images with the same magnification may be different images photographed at different times.

Moreover, the controller 180 may enlarge an original image with respect to a predetermined center point. In this case, the predetermined center point may be the center of the original image.

In some cases, the controller 180 may enlarge the original image with respect to a user's touch point on the original image.

Specifically, if receiving an enlargement photography input from the user input unit 130, the controller 180 may control the camera 121 to photograph an image, enlarge the original image photographed by the camera 121 according to the predetermined magnification, and then simultaneously display the original image and the enlarged image on the display unit 151. Here, the user input unit 130 may include at least one of a switching signal and a touch signal of a function button for the enlargement photography input, and a specific audio signal and a specific gesture signal for the enlargement photography input.

Additionally, the controller 180 may control the camera 121 to continuously photograph a plurality of images at different magnifications. Thereafter, the controller 180 may simultaneously display an original image photographed at a first magnification and at least one of enlarged images photographed at magnifications higher than the first magnification among the plurality of the continuously photographed images on the display unit 151. Similarly, in this case, if receiving the enlargement photography input from the user input unit 130, the controller 180 may control the camera 121 to photograph the images. Subsequently, the controller 180 may simultaneously display the original image photographed at the first magnification and at least one of the enlarged images photographed at magnifications higher than the first magnification among the plurality of the continuously photographed images on the display unit 151.

The power supply unit 190 receives external and internal power under control of the controller 180 and supplies power necessary for operation of the individual components.

A battery may be a built-in rechargeable battery or may be detachably attached to the terminal body for a charging and the like. A connecting port may be configured as an example of the interface unit 170 to which an external charger for supplying power for battery charging is electrically connected.

Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

In the following description of the embodiments of the present invention, it is assumed that the display unit 151 corresponds to a touch screen 151. However, the embodiments of the present invention may be not be limited to the touch screen 151.

In addition, in the embodiments of the present invention, a touch gesture corresponds to a gesture of contact-touching or proximity-touching the touch screen 151 and a touch input corresponds to an input inputted by the touch gesture.

The touch gesture is classified into tapping, touch & drag, flicking, press, multi-touch, pinch-in, pinch-out, etc.

The tapping is an operation of slightly pushing and releasing the touch screen 151. The tapping corresponds to a touch gesture similar to a mouse click in a general personal computer.

The touch & drag is an operation of moving a touch on the touch screen 151 to a specific position while maintaining the touch and then releasing the touch from the touch screen. If an object is dragged, the object can be continuously displayed while the object is moving along the drag direction.

The flicking is an operation of touching the touch screen 151, moving in a specific direction (e.g., top, bottom, left, right, or a diagonal direction) and then releasing a contact point. If a touch input is received by the flicking, the mobile terminal 100 performs processing of a specific operation based on a flicking direction, a flicking speed, and the like. For example, an operation of turning over pages of an e-book can be performed based on the flicking direction.

The press is an operation of touching the touch screen 151 and consistently maintaining the touch for more than a predetermined time.

The multi-touch is an operation of touching a plurality of points of the touch screen 151 at the same time.

The pinch-in is an operation of dragging a plurality of pointers touching the touch screen 151 in a direction that the plurality of the pointers get close to each other. That is, the pinch-in starts from one or more points among a plurality of points touched on the touch screen 151 and drags the plurality of the multi-touched points in a direction that the points are close to each other.

The pinch-out is an operation of dragging a plurality of pointers touching the touch screen 151 in a direction that the plurality of the pointers get away from each other. That is, the pinch-out starts from one or more points among a plurality of points touched on the touch screen 151 and drags the plurality of the multi-touched points in a direction that the points are away from each other.

Figure 2:
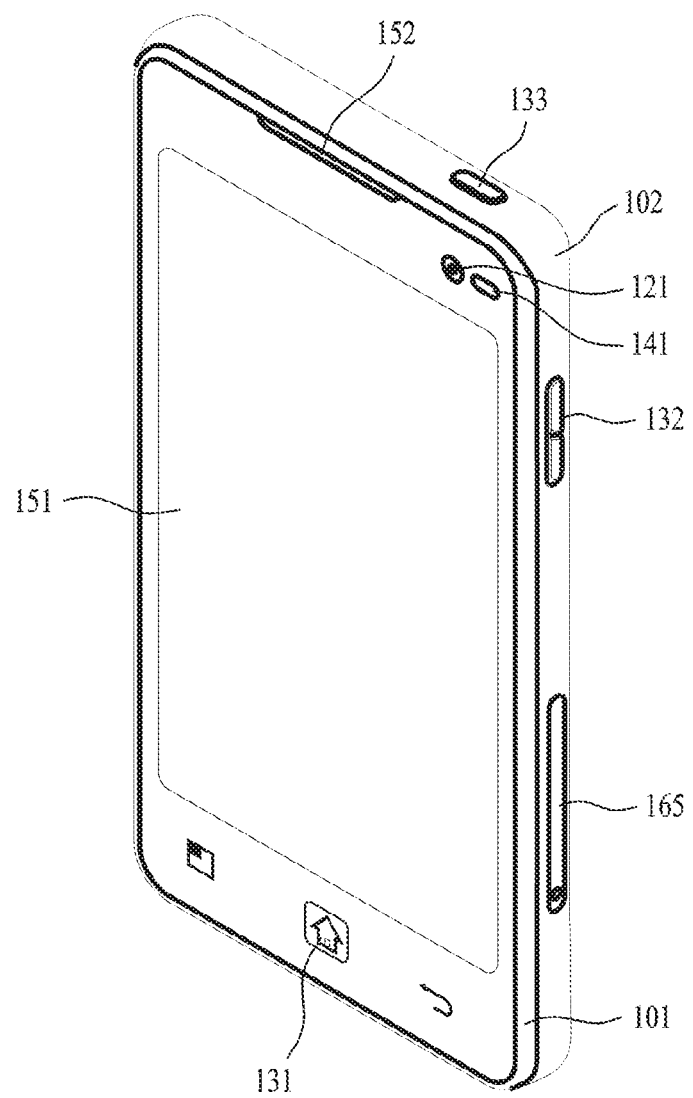
FIG. 2 is a front perspective diagram for one example of a mobile terminal or a portable terminal related to the present invention.

FIG. 2 is a front perspective diagram for one example of a mobile terminal or a portable terminal related to the present invention.

The mobile terminal 100 illustrated in FIG. 2 has a bar type terminal body. However, the present disclosure is not limited thereto and may be applicable to various structures such as a slide type, a folder type, a swing type, a swivel type, and the like, in which two or more bodies are combined to be relatively movable.

The body of the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

In some cases, electronic components can be mounted on a surface of the rear case 102. The electronic components mounted on the surface of the rear case 102 may include such a detachable part as a battery, a USIM card, a memory card and the like. In this case, the rear case 102 may further include a rear cover 103 configured to cover the surface of the rear case 102. In particular, the rear cover 103 has a structure for allowing a user to easily detach the rear cover 103. If the rear cover 103 is detached from the rear case 102, the surface of the rear case 102 is exposed.

If the rear cover 103 is attached to the rear case 102 as shown in FIG. 2, a lateral side of the rear case 102 may be exposed in part. If a size of the rear cover 103 is decreased, a backside of the rear case 102 may be exposed in part. If the rear cover 103 covers the whole backside of the rear case 102, it may include an opening 103' configured to expose a camera 121' or an audio output unit 152' externally.

The cases 101, 102 and 103 are formed by injection molding of synthetic resin or can be formed of a metal substance such as stainless steel (STS), titanium (Ti) or the like for example.

The display unit 151, the audio output unit 152, the camera 121, user input units 130/131 and 132, the microphone 122, the interface unit 170 and the like can be provided to the terminal cases 101 or 102.

The display unit 151 occupies most of a main face of the front case 101. The audio output unit 152 and the camera 121 are provided to an area adjacent to one of both end portions of the display unit 151, while the user input unit 131 and the microphone 122 are provided to an area adjacent to the other end portion of the display unit 151. The user input unit 132 and the interface unit 170 can be provided to lateral sides of the front and rear cases 101 and 102.

The user input unit 130 operates to receive a command for controlling operations of the mobile terminal 100. And, the user input unit 130 may include a plurality of manipulating units 131 and 132. The manipulating units 131 and 132 can be named as a manipulating portion and may adopt any mechanism of a tactile manner that enables a user to perform a manipulation action by experiencing a tactile sense.

Content inputted by the first or second manipulating unit 131 or 132 can be diversely set. For instance, such a command as start, end, scroll and the like is inputted to the first manipulating unit 131. In addition, a command for a volume adjustment of sound outputted from the audio output unit 152 and the like can be inputted to the second manipulating unit 132. Moreover, a command for allowing the display unit 151 to switch to a touch recognition mode and the like can be inputted to a third manipulating unit 133.

Figure 3:
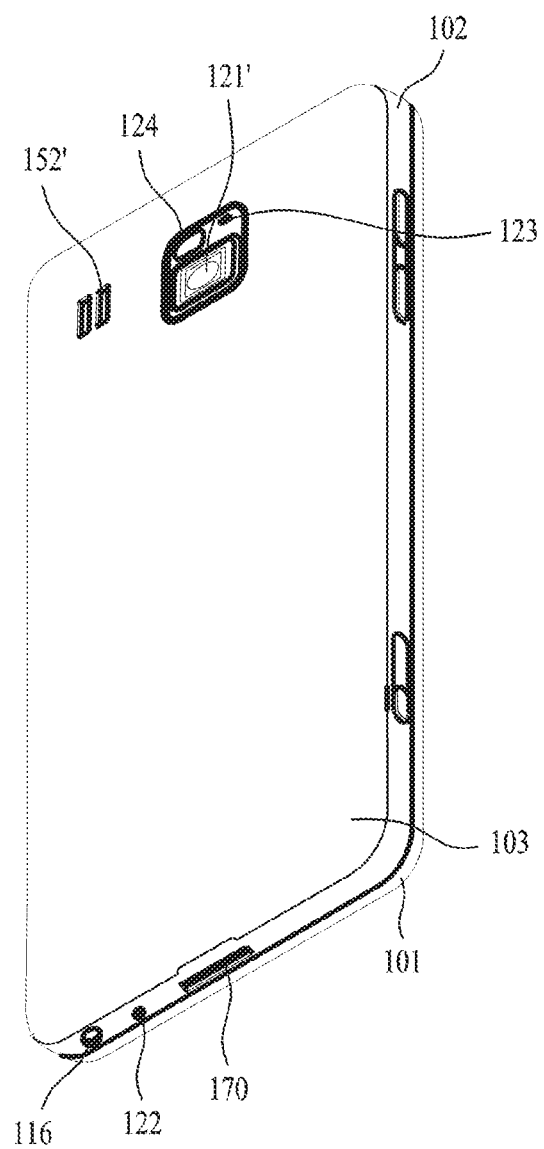
FIG. 3 is a perspective diagram of a rear side of the terminal shown in FIG. 2.

FIG. 3 is a perspective diagram of a rear side of the terminal shown in FIG. 2.

Referring to FIG. 3, the camera 121' can be additionally provided to a rear side of the terminal body, and more particularly, to the rear case 102. The camera 121 has a photographing direction opposite to that of the camera 121 shown in FIG. 2 and may have pixels different from those of the camera 121.

For instance, the camera 121 has low pixels enough to capture and transmit a picture of user's face for a video call, while the camera 121' has high pixels for capturing a general subject for photography without transmitting the captured subject. And, each of the cameras 121 and 121' can be installed in the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An audio output unit 152' can be additionally provided to the rear side of the terminal body. The audio output unit 152' is able to implement a stereo function together with the audio output unit 152 shown in FIG. 2 and may be used for implementation of a speakerphone mode in talking over the terminal.

An antenna 116 for receiving a broadcast signal can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
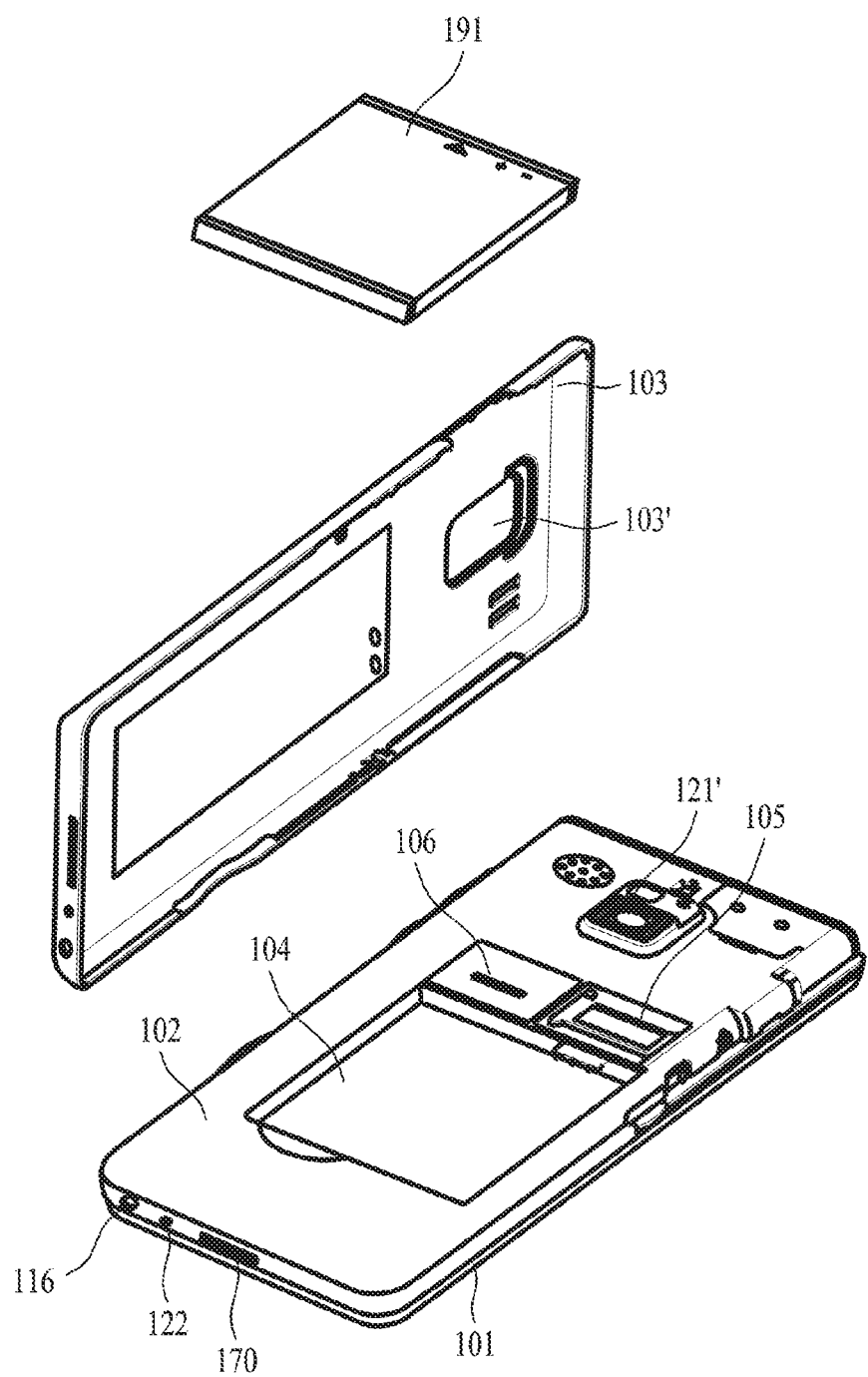
FIG. 4 is a perspective diagram of a surface of a rear case by separating a rear cover of a mobile terminal according to one embodiment of the present invention.

FIG. 4 is a perspective diagram of a surface of a rear case by separating a rear cover of a mobile terminal according to one embodiment of the present invention. In FIG. 4, the front case 101, the rear case 102, the rear cover (or a battery cover) 103, the camera 121', the interface unit 170, the microphone 122, a speaker module 154, the audio output unit 152', a battery 191, a battery loading part 104, a USIM card loading part 166, and a memory card loading part 167 are illustrated.

A space for mounting such external parts as the battery loading part 104, the USIM card loading part 105 and the memory card loading part 106 can be provided to a surface of the rear case 102. Generally, the external components mounted on the surface of the rear case 102 are provided to expand functions of the mobile terminal 100 in order to meet diversified functions of the mobile terminal 100 and various needs of consumers.

As the functions of the mobile terminal 100 are diversified, the battery 191 can be configured with a replaceable type shown in FIG. 4 in order to complement the considerable power consumption. In the case of the replaceable type, the battery loading part 104 is formed on the surface of the rear case 102 in order for a user to load/unload the battery 191. In addition, a connection terminal is provided to the battery loading part 104 in order to be electrically connected the components installed in the case.

As shown in FIG. 4, the USIM card loading part 166 or the memory card loading part 167 may be formed near the battery loading part 104. Alternatively, the USIM card loading part 166 or the memory card loading part 167 may be formed on a bottom surface of the battery loading part 104 so as to be externally exposed in case of unloading the battery 191 from the battery loading part 104. In this case, as a size of the battery loading part 104 can be increased, a size of the battery 191 can be increased as well.

Although FIG. 4 shows the configuration that the USIM card loading part 166 or the memory card loading part 167 is provided to the rear side of the rear case 102, the USIM card loading part 166 or the memory card loading part 167 may be provided a lateral side of the mobile terminal 100 such that the USIM card loading part 166 or the memory card loading part 167 can be loaded/unloaded via the lateral side.

The rear cover 103 is configured to cover the surface of the rear case 102. Hence, the rear cover 103 fixes the battery 191, the USIM card, the memory card and the like, which are mounted on the surface of the rear case 102, not to be separated or detached and also protects the external components from external shocks or particles. Recently, as a waterproof function is added, the mobile terminal 100 may further include a waterproof structure (not shown in the drawing) configured to seal up the mobile terminal 100. Hence, when the rear case 102 and the rear cover 103 are assembled together, the external components can be protected against water.

In the following, embodiments related a method of controlling the aforementioned mobile terminal will be described with reference to the attached drawings.

Figure 5:
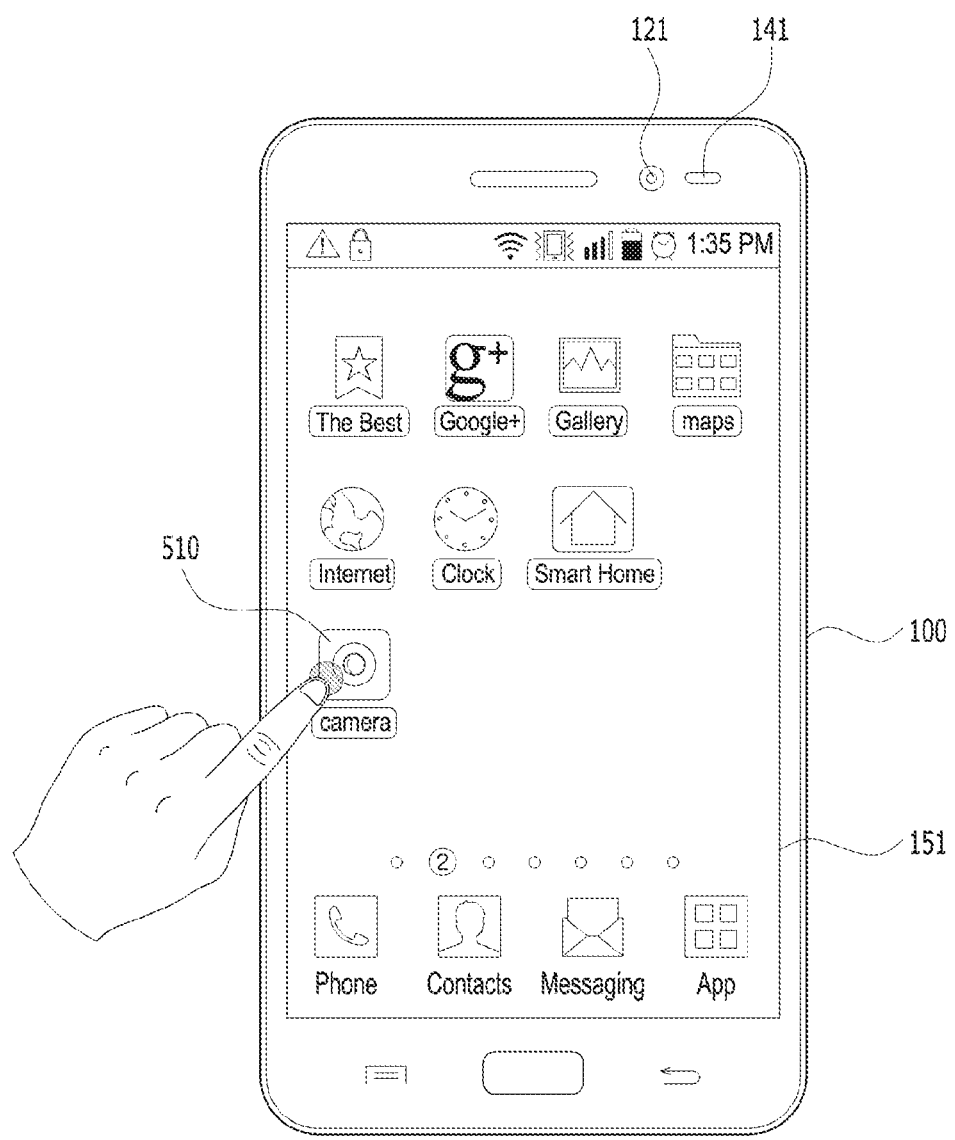
FIGS. 5 to 9 are diagrams for explaining processes for automatically enlarging a person or an object on a photographed image after photographing the image according to an embodiment of the present invention.

As described above, since the existing terminal does not have a function of automatically enlarging and displaying a person on a photographed image, a user has difficulty in selecting a desired image. According to one embodiment of the present invention, a method of automatically enlarging a person or an object on a photographed image and providing the enlarged image to a user when the user photographs the image using a mobile terminal is proposed. Such an embodiment will be described with reference to FIG. 5.

FIGS. 5 to 9 are diagrams for explaining processes for automatically enlarging a person or an object on a photographed image after photographing the image according to an embodiment of the present invention.

First of all, the mobile terminal 100 may include sensors such as the proximity sensor 141 and the like, the camera 121, and display unit 151. In addition, the mobile terminal 100 may display a plurality of functional icons on a screen of the display unit 151. In this case, a user may activate a camera function by touching a camera icon among the plurality of the functional icons displayed on the screen of the display unit 151 or through a specific gesture.

Figure 6:
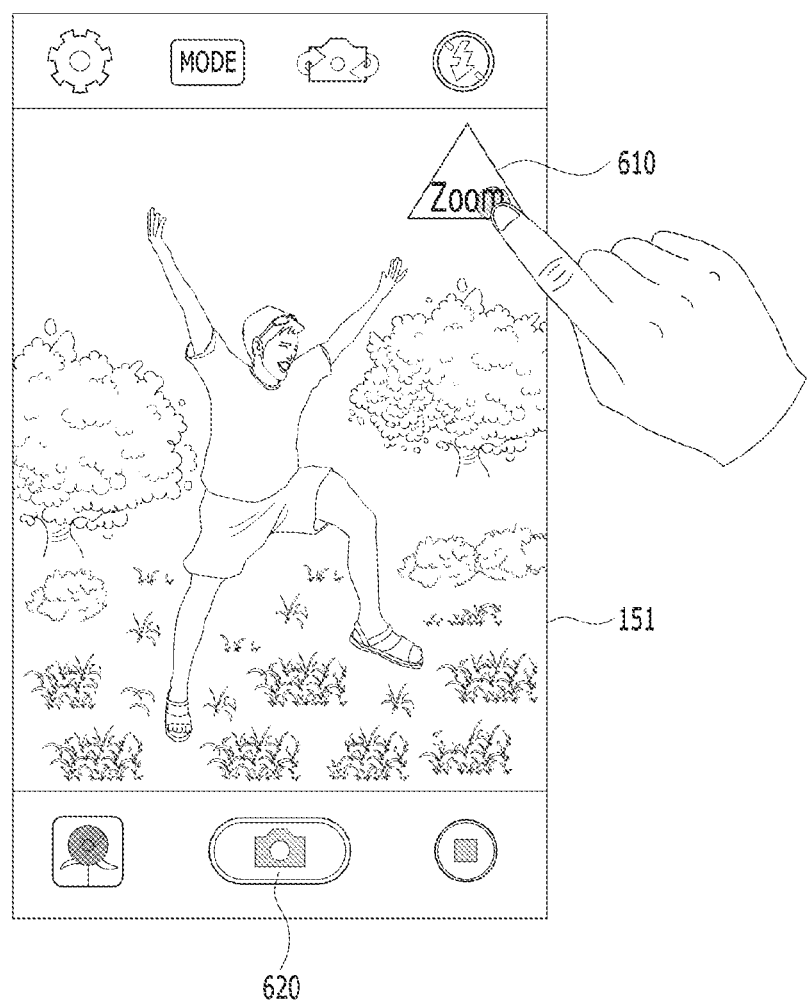
Figure 7:
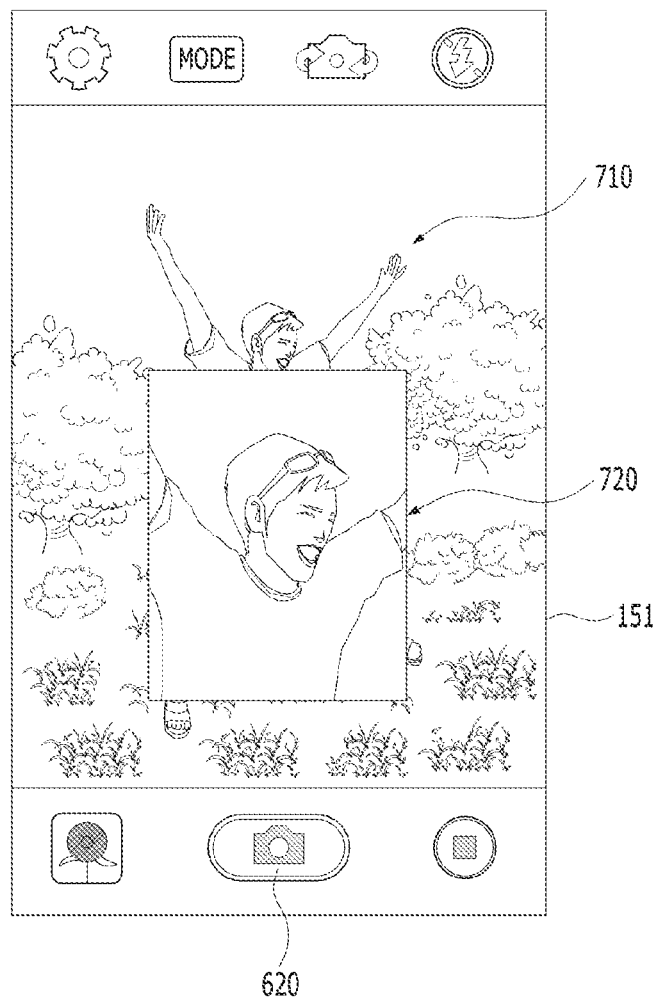

Next, if the camera function is activated, a photographing area is displayed on the screen of the display unit 151 and specific icons related the camera 121 may be arranged as shown in FIG. 6.

In addition, the user input unit for receiving an enlargement photography input may be further included in the screen of the display unit 151. For instance, the user input unit may include at least one of a switching signal and a touch signal of a function button for the enlargement photography input, and a specific audio signal and a specific gesture signal for the enlargement photography input. FIG. 6 shows that a zoom touch button 610 for the enlargement photography input is displayed on the screen of the display unit 151.

Thus, by touching the zoom touch button 610 for the enlargement photography input, the user may switch a camera function mode to a photography mode for generating an enlarged image.

Subsequently, the user may select a photographing area that the user desires to photograph and then photograph the desired area by touching a photography touch button in the user input unit.

Figure 9:
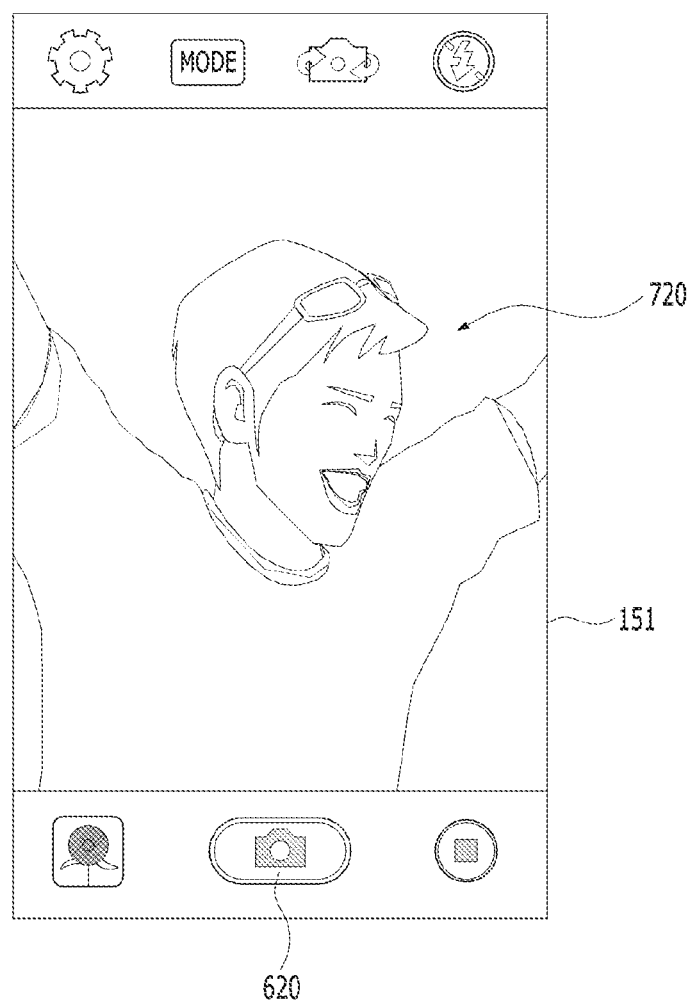

Next, as shown in FIG. 9, the controller of the mobile terminal may enlarge a partial area of an original image 710 according to a predetermined magnification and then simultaneously display the original image 710 and the enlarged image 720 on the display unit 151. In this case, the controller of the mobile terminal may first display the original image 710 on the screen of the display unit 151 and then display the enlarged image 720 by overlapping it over the original image 710. For instance, although the enlarged image 720 displayed over the original image may be a mini-image with a small size, the present invention is not limited thereto.

In addition, when displaying the enlarged image 720 on the screen of the display unit 151, the controller of the mobile terminal may change the current resolution of the display unit 151 such that the resolution matches with the predetermined magnification of the enlarged image 720. That is, when displaying the enlarged image 720 on the screen of the display unit 151, the controller of the mobile terminal checks the current resolution of the display unit 151. This is because if the current resolution of the display unit 151 is lower than the predetermined magnification of the enlarged image 720, the quality of the enlarged image 720 may be degraded. Accordingly, the controller of the mobile terminal may adjust the current resolution of the display unit 151 such that the resolution is higher than the predetermined magnification of the enlarged image 720 in order to improve the quality of the enlarged image 720.

Moreover, the magnification of the enlarged image 720 may be determined in advance. Alternatively, the user may directly configure or change the magnification through a configuration window.

In one case, the controller of the mobile terminal may display the original image 710 and the enlarged image 720 side by side on the display unit 151.

In another case, the controller of the mobile terminal may display a plurality of enlarged images 720 with different magnifications on the display unit 151. In this case, the plurality of the enlarged images 720 with the different magnifications may be the same images photographed at the same time or different images photographed at different times.

In a further case, the controller of the mobile terminal may display a plurality of enlarged images with the same magnification on the display unit 151. In this case, the plurality of the enlarged images with the same magnification may be different images photographed at different times.

Moreover, the controller of the mobile terminal may enlarge the original image 710 with respect to a predetermined center point. In this case, the predetermined center point may be the center of the original image 710.

In some cases, the controller of the mobile terminal may enlarge the original image 710 with respect to a user's touch point on the original image 710.

Further, the controller of the mobile terminal may control the camera to continuously photograph a plurality of images at different magnifications. Thereafter, the controller of the mobile terminal may simultaneously display the original image photographed at the first magnification and at least one of enlarged images photographed at magnifications higher than the first magnification among the plurality of the continuously photographed images on the display unit 151. In this case, if receiving the enlargement photography input from the user input unit, the controller of the mobile terminal may enable the camera to photograph the images. Subsequently, the controller of the mobile terminal may simultaneously display the original image photographed at the first magnification and at least one of the enlarged images photographed at magnifications higher than the first magnification among the plurality of the continuously photographed images on the display unit 151.

Figure 8:
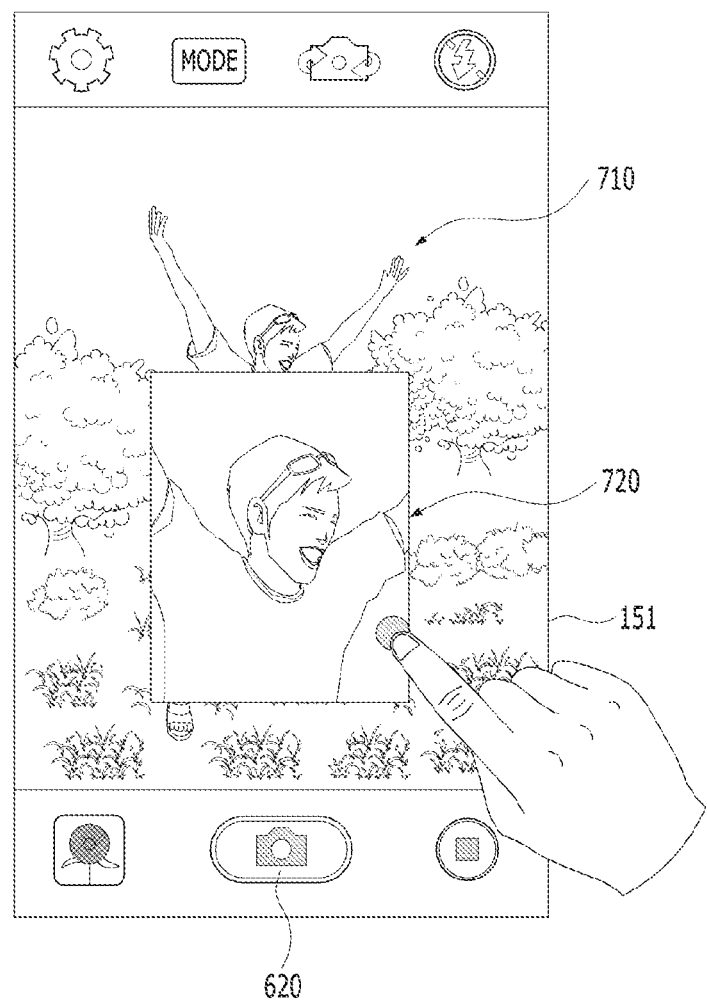

Next, when the user touches the enlarged image 720 displayed on the screen of the display unit 151 as shown in FIG. 8 or performs a specific gesture, the enlarged image 720 may be displayed on a full screen of the display unit 151 as shown in FIG. 9.

In some cases, if the user touches the enlarged image 720 displayed on the screen of the display unit 151 or performs a specific gesture, the enlarged image 720 may be immediately stored.

As described above, if receiving the enlargement photography input from the user input unit, the mobile terminal according to the present invention may enable the camera to photograph images. Thereafter, the mobile terminal may enlarge the partial area of the original image photographed by the camera according to the predetermined magnification and then simultaneously display the original image and the enlarged image on the screen of the display unit.

After photographing the images, the user can be provided with the enlarged image in which a person or an object is automatically enlarged. Moreover, the user can also select a desired image in an easy and simple manner.

FIGS. 10 to 14 are diagrams illustrating enlarged images displayed on a mobile terminal according to the present invention.

As shown in FIGS. 10 to 14, if receiving the enlargement photography input from the user input unit, the mobile terminal according to the present invention may enable the camera to photograph images. Thereafter, the mobile terminal may enlarge the partial area of the original image photographed by the camera according to the predetermined magnification and then simultaneously display the original image and the enlarged image on the screen of the display unit. In this case, the enlarged image may be displayed on the screen of the display unit in various manners.

Figure 10:
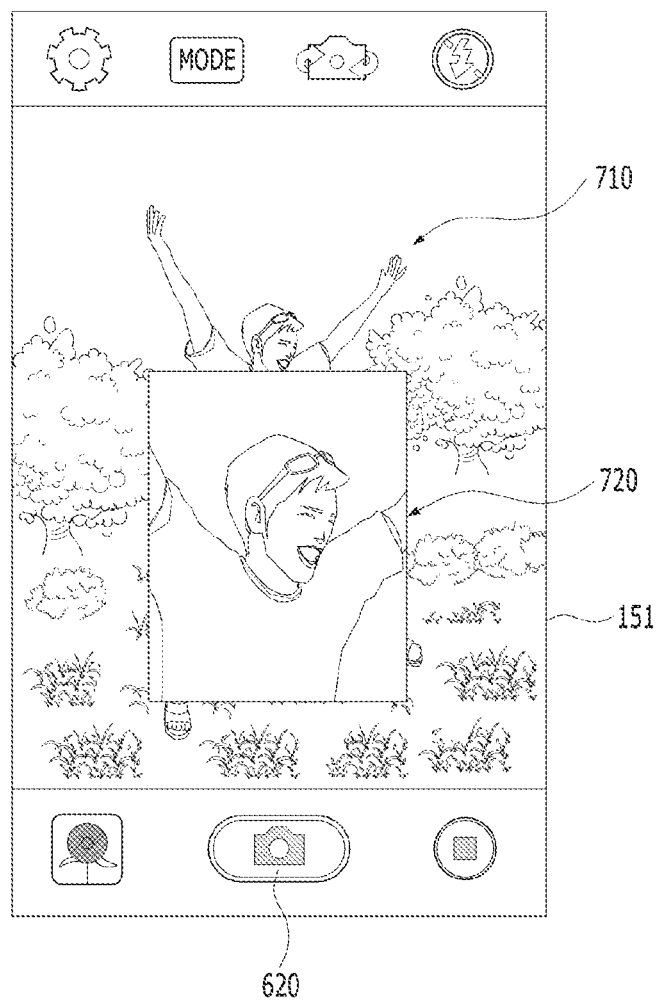
FIGS. 10 to 14 are diagrams illustrating enlarged images displayed on a mobile terminal according to the present invention.

As shown in FIG. 10, after displaying the original image 710 on the screen of the display unit 151, the mobile terminal may display the enlarged image 720 by overlapping it over the original image 710. For instance, although the enlarged image displayed over the original image may be a mini-image, the present invention is not limited thereto.

In this case, when displaying the enlarged image 720 on the screen of the display unit 151, the mobile terminal may change the current resolution of the display unit 151 such that the resolution matches with the predetermined magnification of the enlarged image 720. That is, when displaying the enlarged image 720 on the screen of the display unit 151, the controller of the mobile terminal checks the current resolution of the display unit 151. This is because if the current resolution of the display unit 151 is lower than the predetermined magnification of the enlarged image 720, the quality of the enlarged image 720 may be degraded. Accordingly, the controller of the mobile terminal may adjust the current resolution of the display unit 151 such that the resolution is higher than the predetermined magnification of the enlarged image 720 in order to improve the quality of the enlarged image 720.

Moreover, the magnification of the enlarged image 720 may be determined in advance. Alternatively, the user may directly configure or change the magnification through the configuration window.

Figure 11:
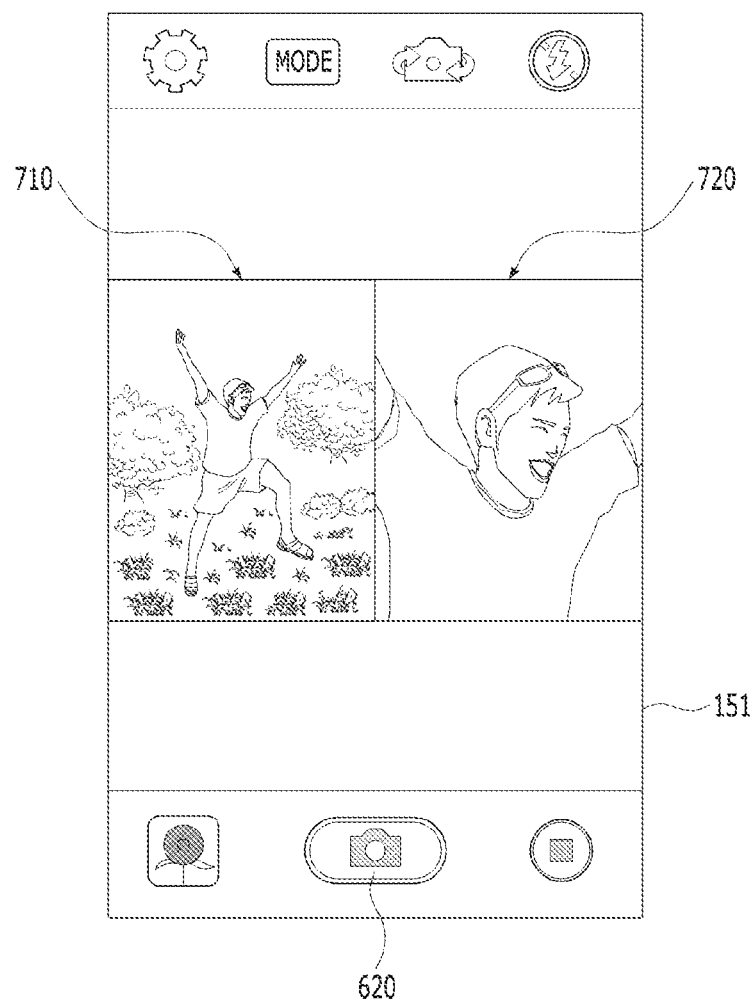

In one case, the mobile terminal may display the original image 710 and the enlarged image 720 side by side on the screen of the display unit 151 as shown in FIG. 11.

Figure 12:
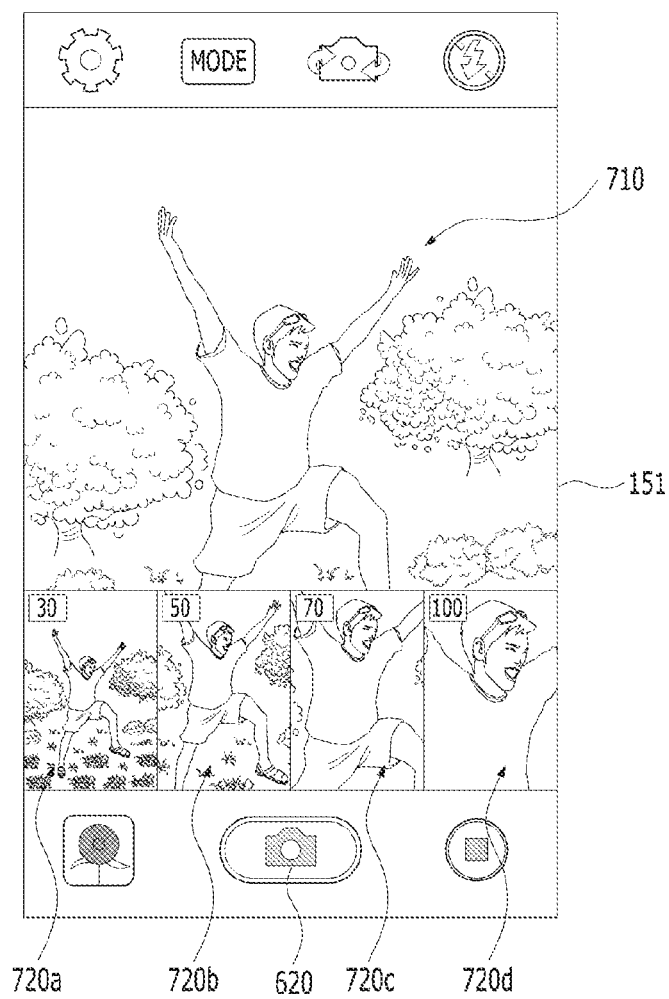

In another case, the mobile terminal may display a plurality of enlarged images 720a, 720b, 720c, and 720d with different magnifications on the screen of the display unit 151 as shown in FIG. 12. In this case, the plurality of the enlarged images 720 with the different magnifications may be the same images photographed at the same time or different images photographed at different times. The former case is that the mobile terminal enlarges the original image 710 photographed by the camera according to predetermined magnifications and then displays the enlarged images 720 on the display unit 151. On the other hand, the latter case is that the mobile terminal controls the camera to continuously photograph a plurality of images at different magnifications and then displays the original image 710 photographed at the first magnification and at least one of enlarged images photographed at magnifications higher than the first magnification among the plurality of the continuously photographed images on the display unit 151.

Additionally, the plurality of the enlarged images 720 may be expressed as mini-images and in this case, the mini-images may be displayed over the original image 710.

Further, the plurality of the enlarged images 720 may be arranged in an order that the magnifications thereof increase from the left of the screen of the display unit 151 to the right. On the contrary, the plurality of the enlarged images 720 may be arranged in an order that the magnifications thereof decrease from the left of the screen of the display unit 151 to the right.

Figure 13:
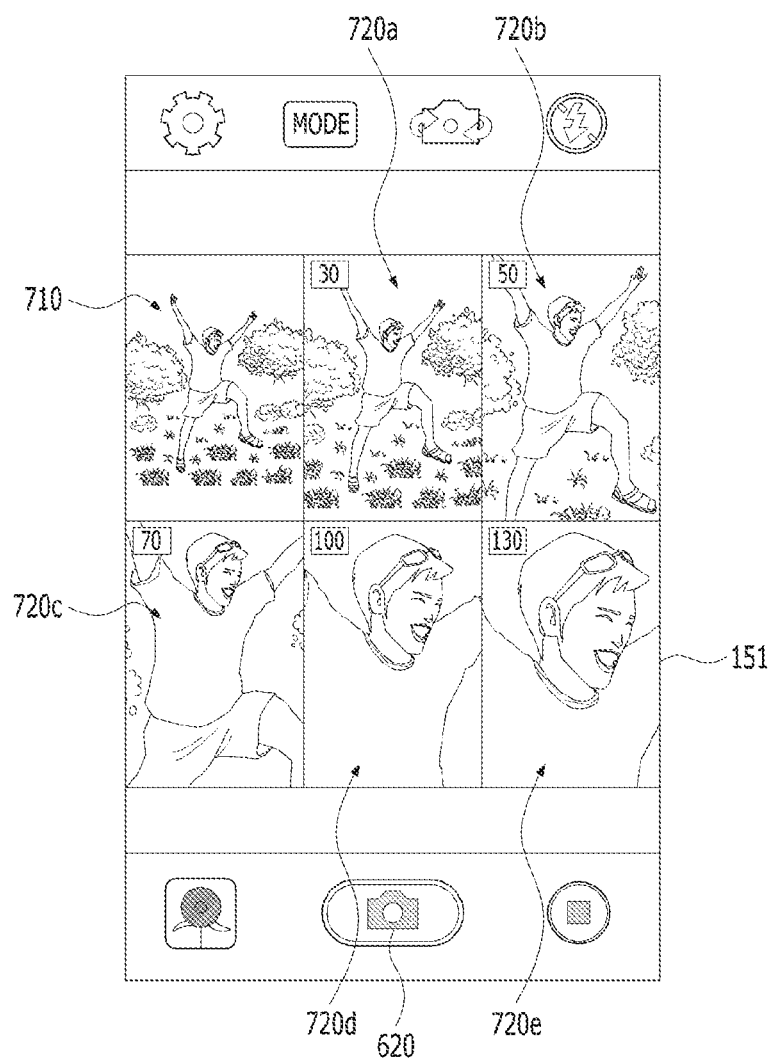

In a further case, the mobile terminal may simultaneously display the original image 710 and the plurality of the enlarged images 720a, 720b, 720c, and 720d with the different magnifications side by side on the screen of the display unit 151 as shown in FIG. 13. In this case, the plurality of the enlarged images 720 with the different magnifications may be the same images photographed at the same time or different images photographed at different times. The former case is that the mobile terminal enlarges the original image 710 photographed by the camera according to predetermined magnifications and then displays the enlarged images 720 on the display unit 151. On the other hand, the latter case is that the mobile terminal controls the camera to continuously photograph a plurality of images at different magnifications and then displays the original image 710 photographed at the first magnification and at least one of enlarged images photographed at magnifications higher than the first magnification among the plurality of the continuously photographed images on the display unit 151.

Additionally, the plurality of the enlarged images 720 may be expressed as mini-images and in this case, the mini-images may be displayed over the original image 710.

Further, the plurality of the enlarged images 720 may be arranged in the order that the magnifications thereof increase from the left of the screen of the display unit 151 to the right. On the contrary, the plurality of the enlarged images 720 may be arranged in the order that the magnifications thereof decrease from the left of the screen of the display unit 151 to the right.

Alternatively, the plurality of the enlarged images 720 may be arranged such that the magnification thereof increase counterclockwise on the screen of the display unit 151. On the contrary, the plurality of the enlarged images 720 may be arranged such that the magnification thereof decrease counterclockwise on the screen of the display unit 151.

Figure 14:
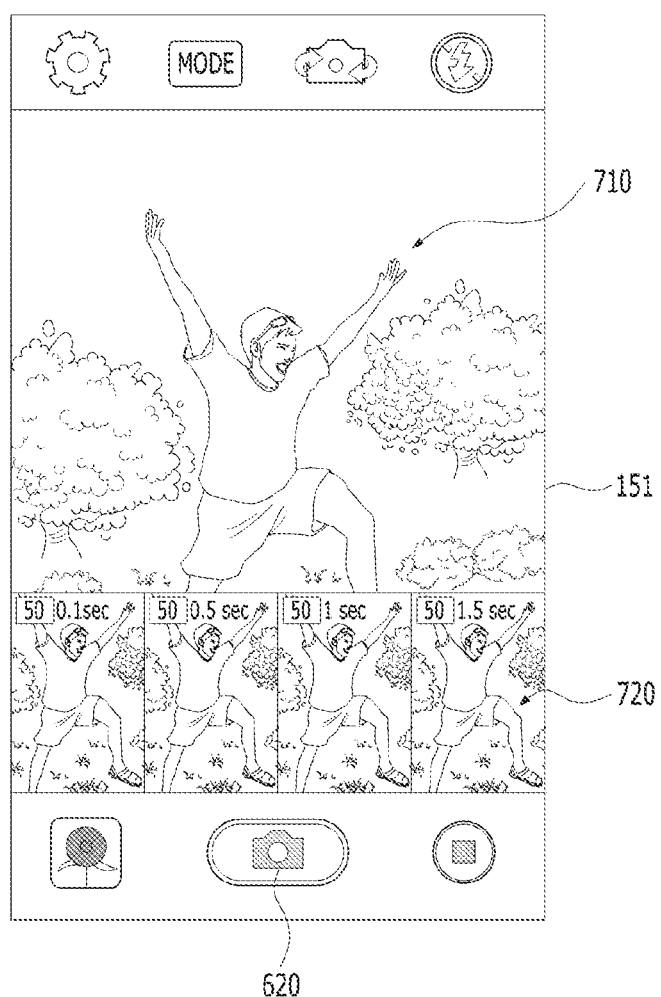

In yet another case, the mobile terminal may display a plurality of enlarged images 720 with the same magnification on the display unit 151 as shown in FIG. 14. In this case, the plurality of the enlarged images 720 with the same magnification may be different images photographed at different times. That is, the case in which the plurality of the enlarged images 720 correspond to the different images photographed at the different times means that the mobile terminal controls the camera to continuously photograph a plurality of images at different magnifications and then displays the original image 710 photographed at the first magnification and at least one of enlarged images photographed at magnifications higher than the first magnification among the plurality of the continuously photographed images on the display unit 151.

Additionally, the plurality of the enlarged images 720 may be expressed as mini-images and in this case, the mini-images may be displayed over the original image 710.

Further, the plurality of the enlarged images 720 may be arranged in an order that photographing times thereof increase from the left of the screen of the display unit 151 to the right. On the contrary, the plurality of the enlarged images 720 may be arranged in an order that the photographing times thereof decrease from the left of the screen of the display unit 151 to the right.

As described above, the mobile terminal according to the present invention can enlarge images and display the enlarged images in various ways and thus provide user convenience.

Figure 15:
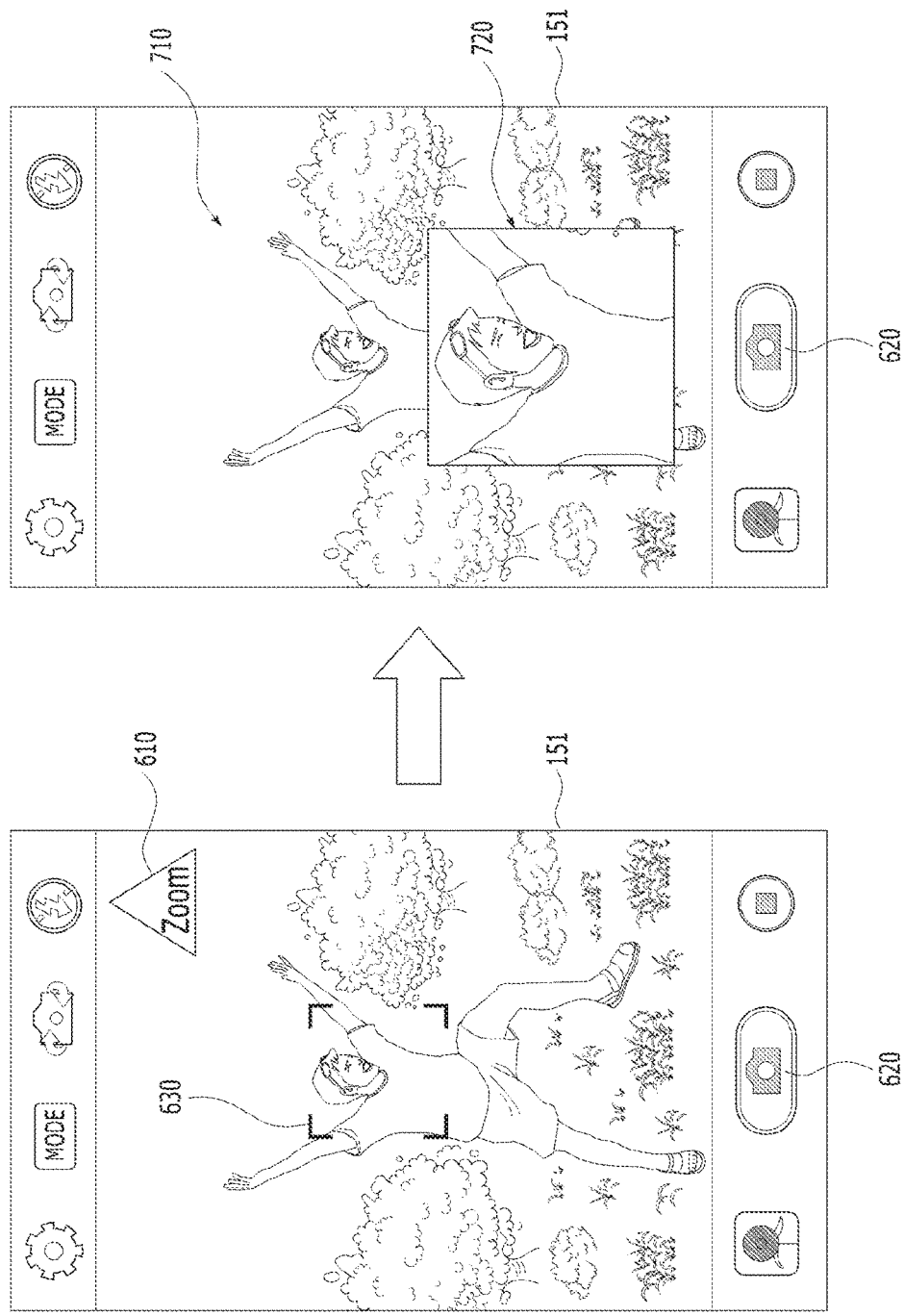
FIGS. 15 and 16 are diagrams for explaining processes for setting a center point to enlarge an original image.
Figure 16:
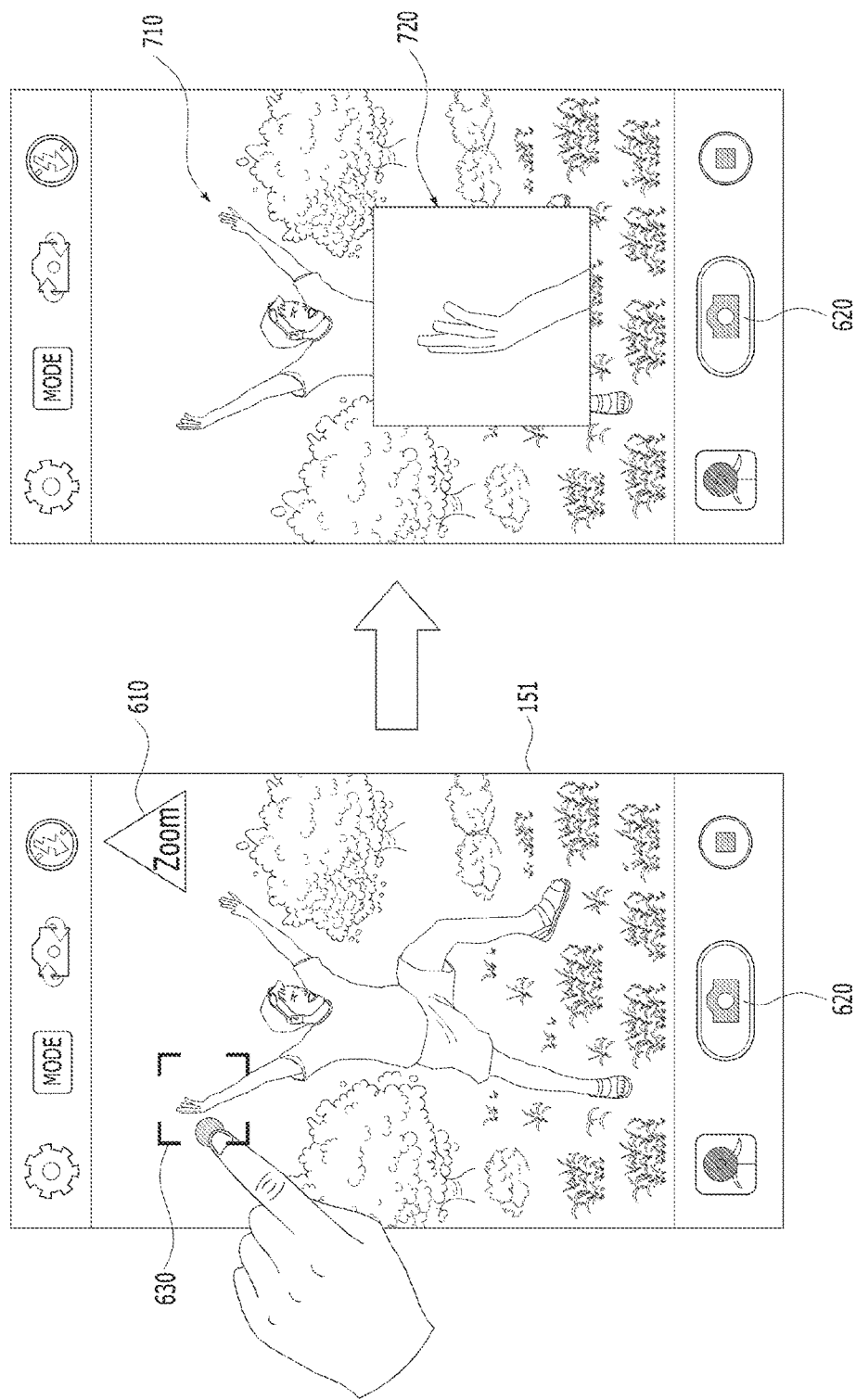

FIGS. 15 and 16 are diagrams for explaining processes for setting a center point to enlarge an original image.

As shown in FIG. 15, when intending to enlarge the original image 710, the controller of the mobile terminal may enlarge the original image 710 with respect to a predetermined center point 630. In this case, the predetermined center point 630 may be the center of the original image 710.

For instance, if the zoom touch button 610 for the enlargement photography input is touched, the controller of the mobile terminal may switch the camera function mode to the photography mode for generating an enlarged image and then display the enlargement center point 630 on the original image 710. In this case, the enlargement center point 630 on the original image 710 may be determined in advance. Alternatively, the user may move and change the enlargement center point 630 on the original image 710.

If the enlargement center point 630 on the original image 710 is set in a center area of the original image 710, the enlarged image 720 may be generated with respect to the center area of the original image 710 at a prescribed magnification.

In some cases, as shown in FIG. 16, when intending to enlarge the original image 710, the controller of the mobile terminal may enlarge the original image 710 with respect the user's touch point.

For instance, if the zoom touch button 610 for the enlargement photography input is touched, the controller of the mobile terminal may switch the camera function mode to the photography mode for generating an enlarged image and then display the enlargement center point 630 on the original image 710. In this case, the enlargement center point 630 on the original image 710 may be mover and changed by a touch or gesture of the user.

If the enlargement center point 630 on the original image 710 is set in a certain area of the original image 710, the enlarged image 720 may be generated with respect to the certain area of the original image 710 at the prescribed magnification.

Figure 17:
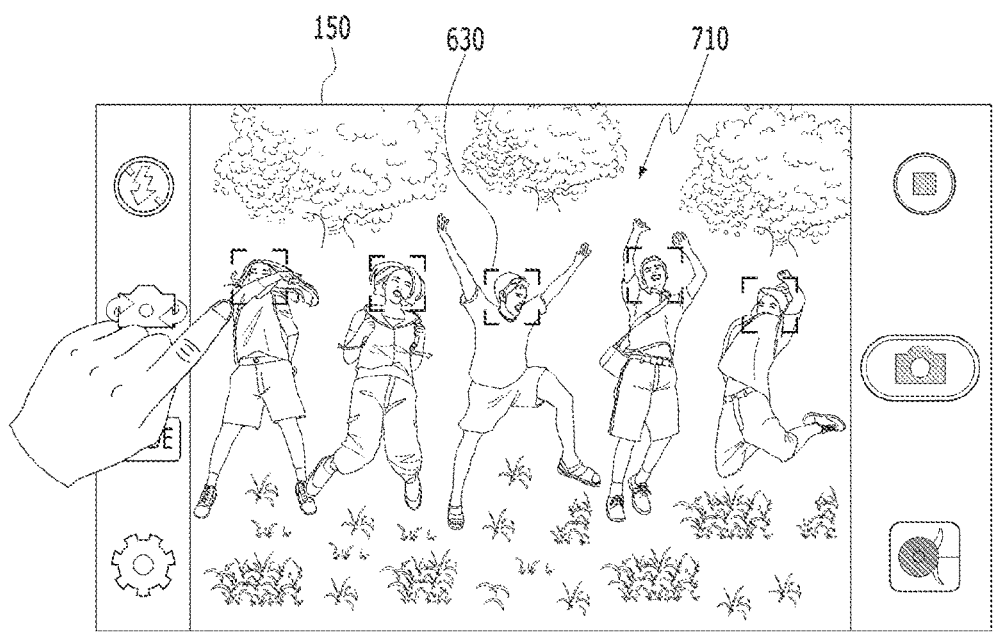
FIGS. 17 to 19 are diagrams for explaining a method of automatically enlarging and displaying a plurality of persons on a photographed image after taking the group picture according to another embodiment of the present invention.
Figure 18:
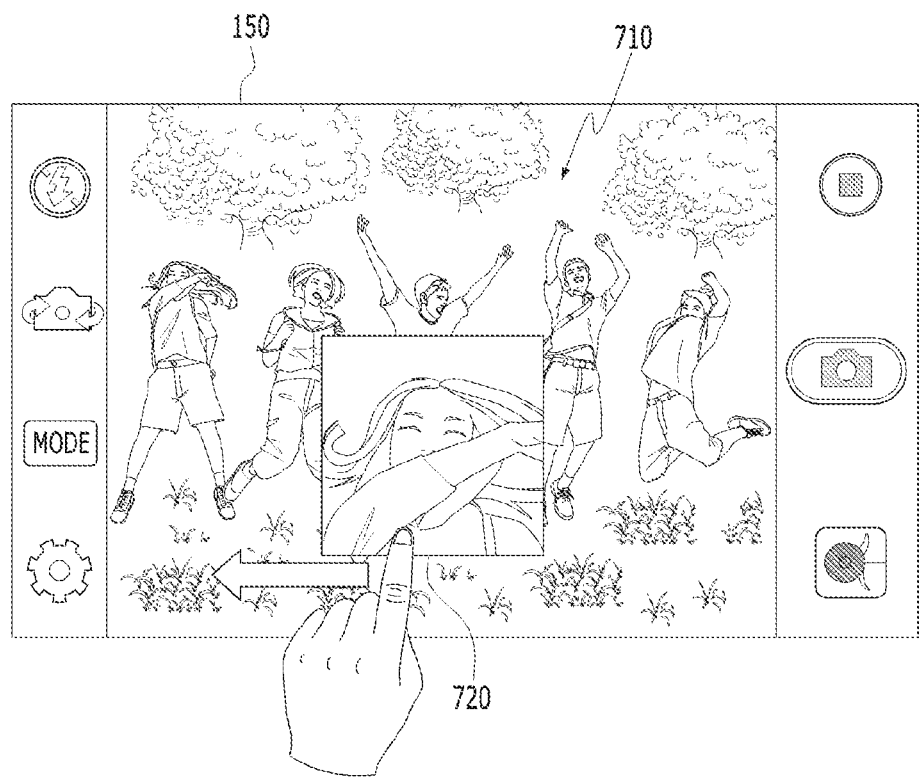
Figure 19:
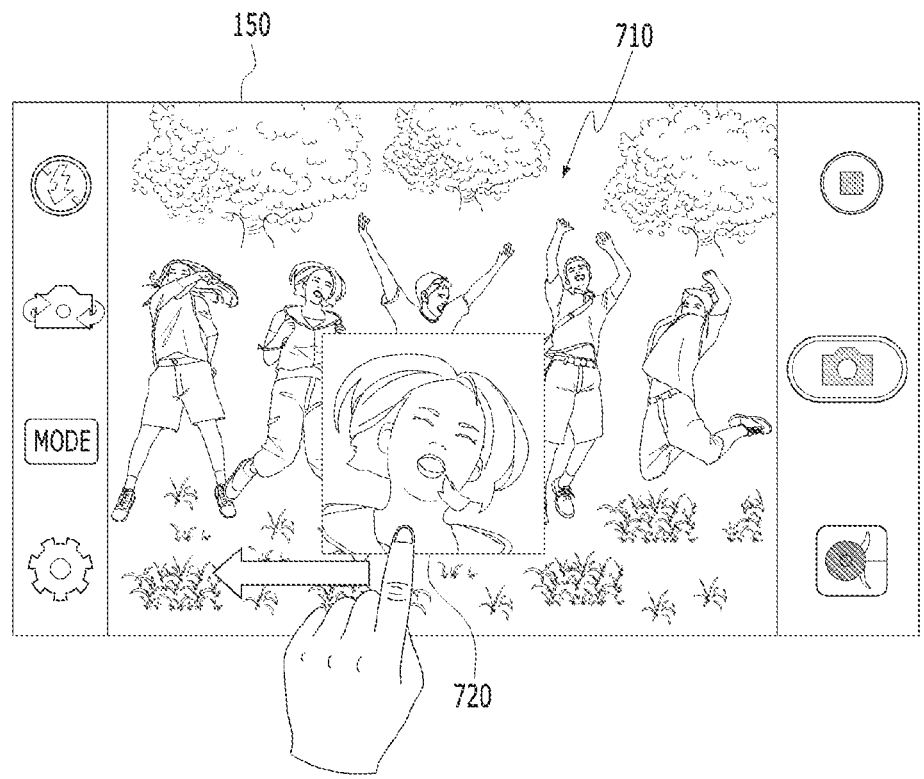

FIGS. 17 to 19 are diagrams for explaining a method of automatically enlarging and displaying a plurality of persons on a photographed image after taking the group picture according to one embodiment of the present invention.

First of all, to take the group picture, the user may activate the camera function of the mobile terminal 100, touch the zoom touch button for the enlargement photography input, and then switch the camera function mode to the photography mode for generating an enlarged image.

Thereafter, the user may select a photographing area that the user desires to photograph and then photograph the desired area by touching a photography touch button in the user input unit.

Next, as shown in FIG. 17, if the user touches partial areas, which the user desires to enlarge, of the original image 710 photographed by the camera, the mobile terminal may display the enlargement center points 630 on the original image 710.

For instance, when the partial areas that the user desires to enlarge correspond to faces of the people in the group picture, the user may configure the enlargement center points 630 on the original image 710 by touching face areas corresponding to the faces of the individual people in the group picture. In this case, the number of the enlargement center points 630 of the original image 710 may be determined according to the number of the peoples in the group picture.

Next, as shown in FIG. 18, if the enlargement center points 630 of the original image 710 are configured, the controller of the mobile terminal may enlarge the face areas corresponding to the individual enlargement center points 630 at the predetermined magnification and then simultaneously display the original image 710 and the enlargement image(s) 720 on the display unit 151. In this case, the enlarged image 720 displayed on the display unit 151 may include a face of one of the multiple people. In some cases, the enlarged images 720 may include several people's faces. Moreover, the controller of the mobile terminal may sequentially generate, save, and arrange the enlarged images 720 according to a configuration order of the enlargement center points 630 determined by the user.

Thereafter, as shown in FIG. 19, when the user scrolls the enlargement image 720 in a prescribed direction, the controller of the mobile terminal may display another person's face on the enlargement image 720. In this case, whenever the user scrolls the enlargement image 720 in the prescribed direction, the controller of the mobile terminal may sequentially display other people's faces on the enlargement image 720. Moreover, the controller of the mobile terminal may sequentially display the people's faces according to the configuration order of the enlargement center points 630 determined by the user.

As described above, when a group picture is photographed, the mobile terminal according to the present invention may generate images of faces of the people in the group picture, enlarge the images, and then display the enlarged images. Moreover, when the user scrolls the enlarged image, the mobile terminal may sequentially display the enlarged images corresponding to the enlarged faces of the people, whereby user convenience can be improved.

FIGS. 20 to 23 are diagrams for explaining a method of automatically enlarging and displaying a plurality of persons on a photographed image after taking the group picture according to another embodiment of the present invention.

Figure 20:
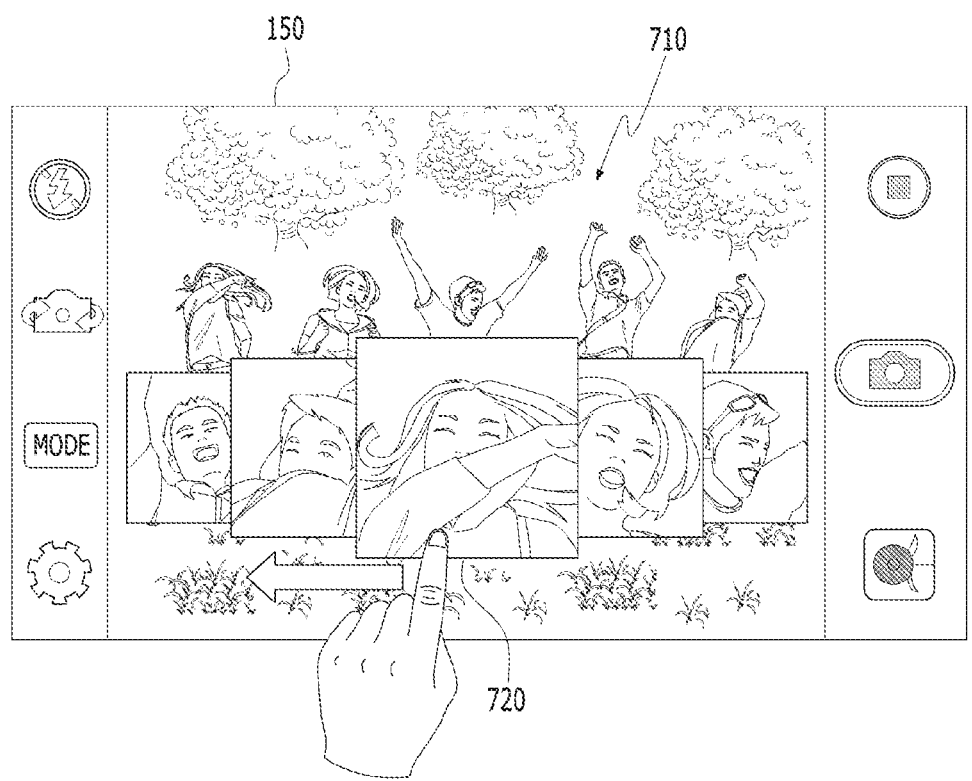
FIGS. 20 to 23 are diagrams for explaining a method of automatically enlarging and displaying a plurality of persons on a photographed image after taking the group picture according to another embodiment of the present invention.

As shown in FIG. 20, if the enlargement center points 630 of the original image 710 are configured, the controller of the mobile terminal may enlarge the face areas corresponding to the individual enlargement center points 630 at the predetermined magnification and then simultaneously display the original image 710 and the enlargement images 720 on the display unit 151. In this case, the controller of the mobile terminal may display a plurality of the enlargement images corresponding to the enlarged faces of the different people included in the original image 710 on the display unit 151. In addition, the controller of the mobile terminal may display a main enlarged image among the plurality of the enlarged images on the center of the display unit 151 and may display subordinate enlarged images on the periphery of the main enlarged image in an overlapping manner. In other words, the controller of the mobile terminal may display the plurality of the enlarged images containing different areas of the original images 710 in the form of a panorama side by side or by partially overlapping the enlarged images. For instance, the faces of the people in the group picture may be displayed on the panorama, showing the plurality of the enlarged images. Further, the controller of the mobile terminal may sequentially arrange the enlarged images 720 according to the configuration order of the enlargement center points 630 determined by the user.

Figure 21:
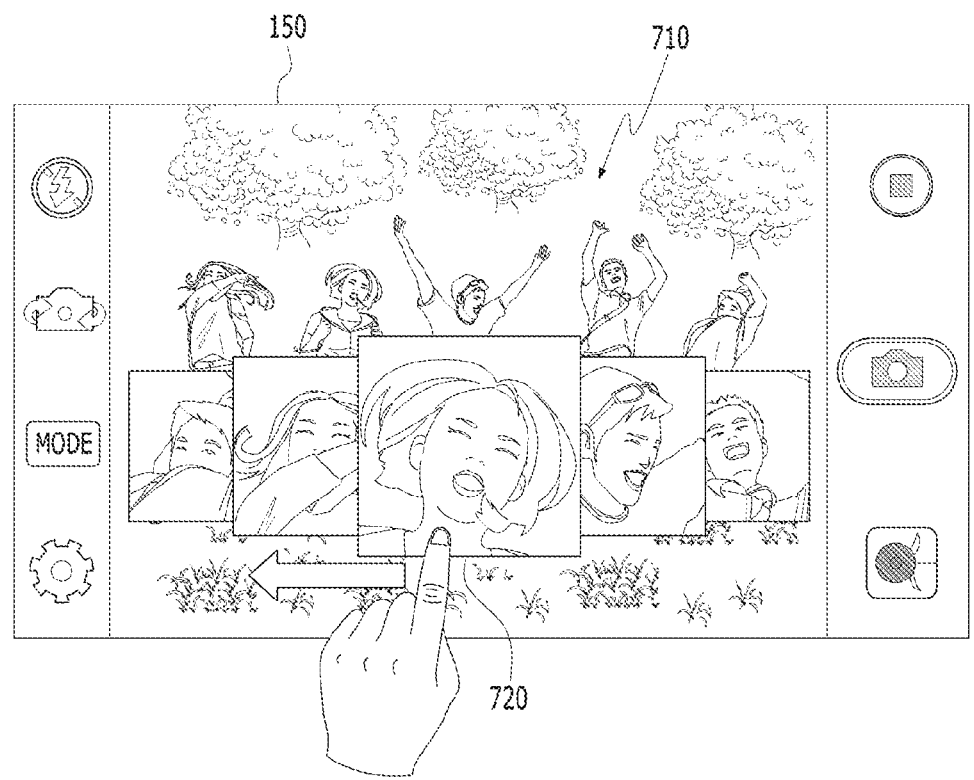

In addition, as shown in FIGS. 20 and 21, when the user scrolls the main enlarged image 720 in the prescribed direction, the controller of the mobile terminal may move the main enlarged image displayed on the center of the display unit 151 aside and locate a subordinate enlarged image at the center of the display unit 151. Thus, the faces of the people can be displayed one by one.

Figure 22:
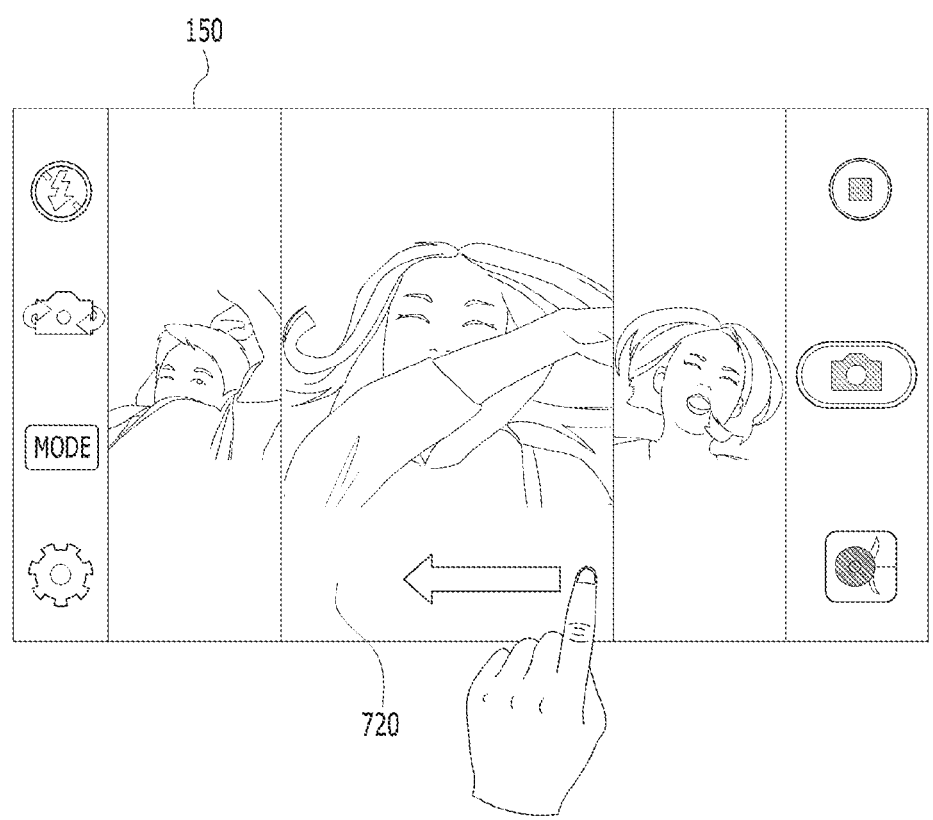

In one case, as shown in FIG. 22, the controller of the mobile terminal may display only the plurality of the enlarged images corresponding to the enlarged faces of the individual people on the display unit 151 without the original image 710. In this case, the controller of the mobile terminal may display the main enlarged image among the plurality of the enlarged images on the center of the display unit 151 and may display the subordinate enlarged images on the periphery of the main enlarged image in the overlapping manner. In addition, when the user scrolls the main enlarged image 720 in the prescribed direction, the controller of the mobile terminal may move the main enlarged image displayed on the center of the display unit 151 aside and locate the subordinate enlarged image at the center of the display unit 151. Thus, the faces of the people can be displayed one by one.

Figure 23:
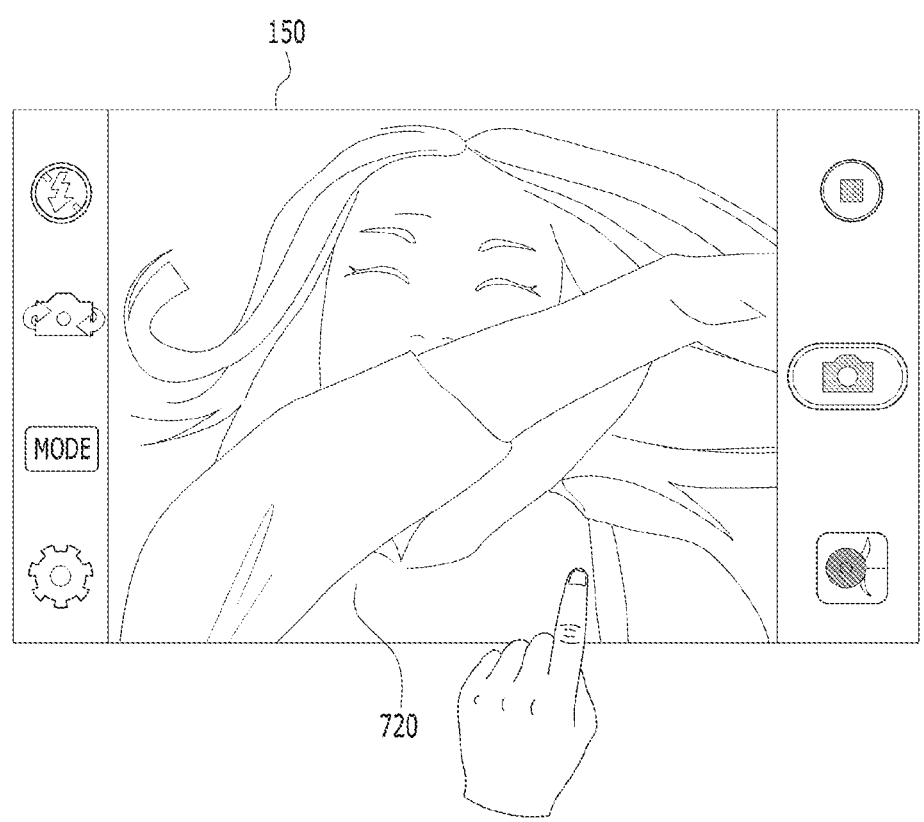

In another case, as shown in FIG. 23, the controller of the mobile terminal may display only the main enlarged image among the plurality of the enlarged images corresponding to the enlarged faces of the individual people on the display unit 151 without the original image 710. In addition, when the user scrolls the main enlarged image 720 in the prescribed direction, the controller of the mobile terminal may change the main enlarged image of a specific person, which is currently displayed on the display unit 151, to another enlarged image of a different person. Thus, the faces of the people can be displayed one by one.

Figure 24:
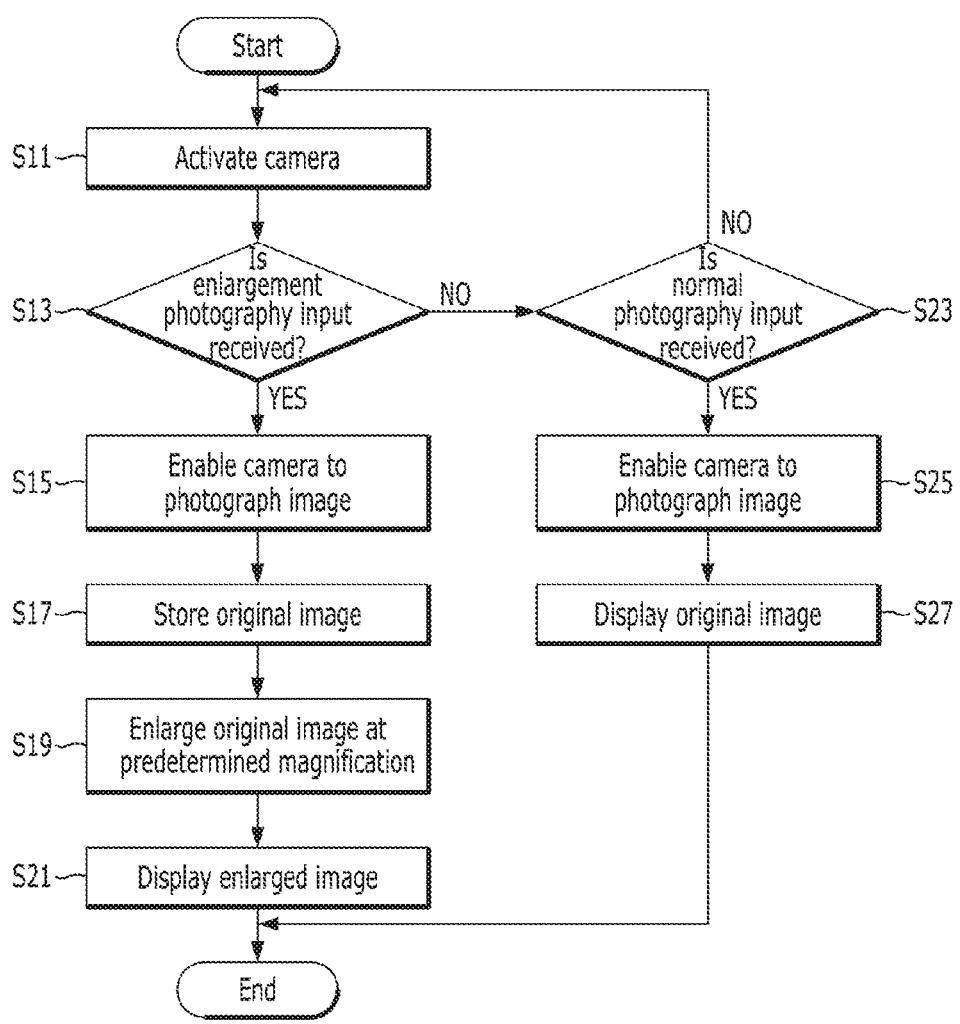
FIGS. 24 and 25 are flowcharts for explaining a method of controlling a mobile terminal according to a first embodiment of the present invention.
Figure 25:
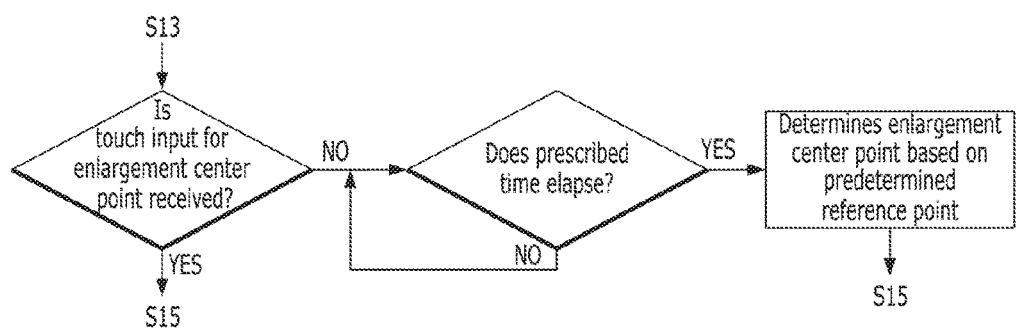

FIGS. 24 and 25 are flowcharts for explaining a method of controlling a mobile terminal according to a first embodiment of the present invention.

As shown in FIGS. 24 and 25, a mobile terminal may activate a camera function in accordance with a touch input or a specific gesture input of a user [S11].

Subsequently, the mobile terminal checks whether an enlargement photography input signal is received from a user input unit [S13].

Next, when the mobile terminal confirms that the enlargement photography input signal is received, the mobile terminal may enable a camera to photograph images by switching a camera function mode to a photography mode for generating an enlarged image [S15].

The mobile terminal stores an original image photographed by the camera [S17].

Thereafter, the mobile terminal may enlarge a partial area of the stored original image at a predetermined magnification [S19]. In this case, the magnification of the enlarged image may be determined in advance. Alternatively, the user may directly determine and change the magnification through a configuration window.

In addition, the mobile terminal may simultaneously display the enlarged image and the original image on a display unit [S21]. In this case, the mobile terminal may display the enlarged image by overlapping it over the original image.

Moreover, when displaying the enlarged image on a screen of the display unit, the mobile terminal may change the current resolution of the display unit such that the resolution matches with the predetermined magnification of the enlarged image.

Meanwhile, if the enlargement photography input signal is not received in the step S13, the mobile terminal may checks whether a normal photography input signal is inputted [S23].

Next, when the normal photography input signal is received, the mobile terminal may enable the camera to photograph images in a normal photography mode [S25].

In some cases, when the mobile terminal fails to receive the enlargement photography input signal during a prescribed time, the mobile terminal may directly enter the normal photography mode [S25].

Thereafter, the mobile terminal may store the original image photographed by the camera and then display the stored original image on the screen of the display unit [S27].

Further, as shown in FIG. 25, if the mobile terminal receives the enlargement photography input signal after the step S13 in which the mobile terminal checks whether the enlargement photography input signal is received from the user input unit, the mobile terminal may check whether a touch input signal for an enlargement center point is received.

When the mobile terminal confirms that the touch input signal for the enlargement center point is received, the mobile terminal determines the enlargement center point in accordance with the touch input signal for the enlargement center point. Subsequently, the mobile terminal may enable the camera to photograph images by switching the camera function mode to the photography mode for generating the enlarged image [S15].

On the contrary, when the mobile terminal confirms that the touch input signal for the enlargement center point is not received, the mobile terminal may checks whether the prescribed time elapses.

Next, when the mobile terminal confirms that the prescribed time elapses, the mobile terminal determines the enlargement center point based on a predetermined reference point. Subsequently, the mobile terminal may enable the camera to photograph images by switching the camera function mode to the photography mode for generating the enlarged image [S15].

Figure 26:
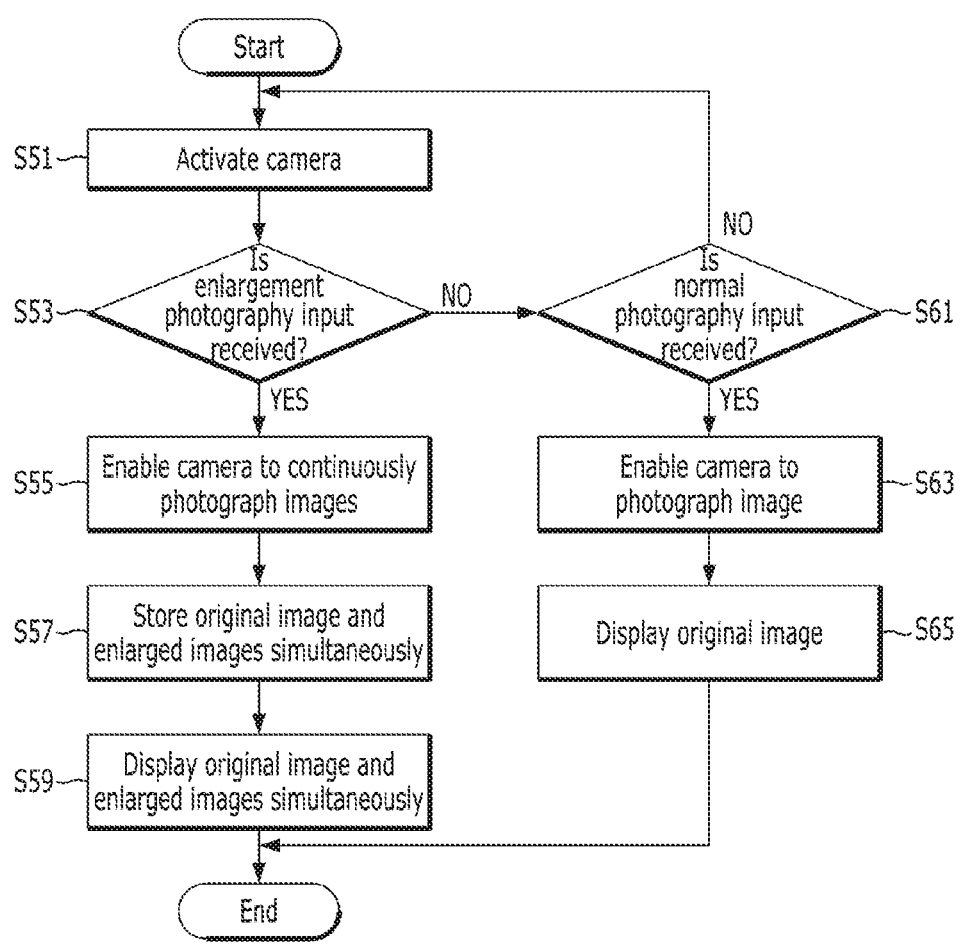
FIG. 26 is a flowchart for explaining a method of controlling a mobile terminal according to a second embodiment of the present invention.

FIG. 26 is a flowchart for explaining a method of controlling a mobile terminal according to a second embodiment of the present invention.

As shown in FIG. 26, a mobile terminal may activate a camera function in accordance with a touch input or a specific gesture input of a user [S51].

Subsequently, the mobile terminal checks whether an enlargement photography input signal is received from a user input unit [S53].

Next, when the mobile terminal confirms that the enlargement photography input signal is received, the mobile terminal may enable a camera to continuously photograph images by switching a camera function mode to a photography mode for generating enlarged images [S55].

Thereafter, the mobile terminal may simultaneously store an original image and a plurality of enlarged images, which are continuously photographed by the camera [S57].

In addition, the mobile terminal may simultaneously display the original image photographed at a first magnification and at least one of the enlarged images photographed at magnifications higher than the first magnification among the stored images on a display unit [S59]. In this case, the mobile terminal may display the enlarged images by overlapping them over the original image.

Meanwhile, if the enlargement photography input signal is not received in the step S53, the mobile terminal may checks whether a normal photography input signal is inputted [S61].

Next, when the normal photography input signal is received, the mobile terminal may enable the camera to photograph images in a normal photography mode [S63].

In some cases, when the mobile terminal fails to receive the enlargement photography input signal during a prescribed time, the mobile terminal may directly enter the normal photography mode [S63].

Thereafter, the mobile terminal may store the original image photographed by the camera and then display the stored original image on the screen of the display unit [S65].

As described above, according to the embodiments of the present invention, after photographing images, the mobile terminal automatically enlarges a person or an object on the photographed images and then provides the enlarged images to the user, whereby the user can select a desired image easily and conveniently.

MODE FOR CARRYING OUT INVENTION

A clip type mobile terminal according to the present invention should not be limited to the above-described configurations and methods of the embodiments. In addition, some or all of the embodiments are selectively combined to make various modifications.

Although the present invention has been described with reference to the preferred embodiments thereof, the invention is not limited to the aforementioned specific embodiments. In addition, it will be understood by those skilled in the art that various changes in form and detail may be made without departing from the spirit and scope of the invention. It is also apparent that such variations of this specification are not to be understood individually or separately from the technical scope or spirit of this specification

INDUSTRIAL APPLICABILITY

The present invention is directed to a mobile terminal and controlling method thereof, which facilitates the use of the terminal in further consideration of user's convenience.

What is claimed is:

1. A mobile terminal, comprising:
a camera;
a display; and
a controller configured to:
   detect a plurality of partial areas of an original image photographed by the camera in response to a touch input received on the plurality of partial areas;
   enlarge each partial area of the plurality of partial areas at a predetermined magnification such that an enlarged image corresponding to the enlarged partial area is displayed while the original image is displayed on the display;
   cause the display to display a next one of a plurality of enlarged images corresponding to a respective one of the enlarged plurality of partial areas in response to a scrolling command received from a user while the enlarged image and the original image are displayed together,
   wherein the plurality of enlarged images are displayable one by one in order that respectively corresponding partial areas were touched by the user when a series of multiple scrolling commands are received; and
   cause the display to display enlargement center points on the original image in response to the touch input such that each of the enlargement center points is displayed on a corresponding one of the plurality of partial areas.

2. The mobile terminal of claim 1, wherein the enlarged image is displayed over the original image.

3. The mobile terminal of claim 1, further comprising a user input unit for receiving an enlargement photography input, wherein when the enlargement photography input is received from the user input unit, the controller enables the camera to photograph the original image, enlarges the partial area of the original image photographed by the camera at the predetermined magnification, and causes the display to simultaneously display the original image and the enlarged image.

4. The mobile terminal of claim 3, wherein the user input unit comprises at least one selected from the group consisting of a switching signal and a touch signal of a function button for the enlargement photography input, and a specific audio signal and a specific gesture signal for the enlargement photography input.

5. A method of controlling a mobile terminal including a camera and a display, the method comprising:
   detecting a plurality of partial areas of an original image photographed by the camera in response to a touch input received on the plurality of partial areas;
   enlarging each partial area of the plurality of partial areas at a predetermined magnification such that an enlarged image corresponding to the enlarged partial area is displayed while the original image is displayed on the display;
   displaying a next one of a plurality of enlarged images corresponding to a respective one of the enlarged plurality of partial areas in response to a scrolling command received from a user while the enlarged image and the original image are displayed together,
   wherein the plurality of enlarged images are displayable one by one in order that respectively corresponding partial areas were touched by the user when a series of multiple scrolling commands are received; and
   causing the display to display enlargement center points on the original image in response to the touch input such that each of the enlargement center points is displayed on a corresponding one of the plurality of partial areas.

6. The mobile terminal of claim 1, wherein the plurality of partial areas correspond to faces of people in the original image.

7. The mobile terminal of claim 6, wherein a number of the enlargement center points correspond to a number of the people in the original image.

8. The mobile terminal of claim 1, wherein each of the plurality of enlarged images includes a face of one of people in the original image.

9. The mobile terminal of claim 8, wherein the enlarged image and the next one of the plurality of enlarged images correspond to different faces of the people in the original image.

* * * * *